United States Patent
Kinoshita et al.

(10) Patent No.: US 8,216,704 B2
(45) Date of Patent: *Jul. 10, 2012

(54) BIAXIALLY ORIENTED LAMINATED FILM

(75) Inventors: Eiji Kinoshita, Gifu (JP); Ieyasu Kobayashi, Gifu (JP); Mitsuo Tojo, Gifu (JP); Tomoyuki Kishino, Matsuyama (JP); Kazuteru Kohno, Iwakuni (JP)

(73) Assignee: Teijin Limited, Osaka-shi (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/664,216

(22) PCT Filed: Jun. 11, 2008

(86) PCT No.: PCT/JP2008/061072
§ 371 (c)(1),
(2), (4) Date: Apr. 12, 2010

(87) PCT Pub. No.: WO2008/153188
PCT Pub. Date: Dec. 18, 2008

(65) Prior Publication Data
US 2010/0190037 A1    Jul. 29, 2010

(30) Foreign Application Priority Data

Jun. 13, 2007  (JP) ................................. 2007-156330
Jan. 18, 2008  (JP) ................................. 2008-009228

(51) Int. Cl.
C08G 63/12  (2006.01)
G11B 5/73   (2006.01)
D06N 7/04   (2006.01)

(52) U.S. Cl. ............... 428/847.3; 428/847.4; 428/847.7; 428/483; 528/176; 528/209

(58) Field of Classification Search ............... 428/846.4, 428/1.1, 847.1, 483, 329, 847, 847.2, 847.3, 428/847.4, 847.6, 847.8, 848.2, 845.6, 848, 428/840.1, 480, 482, 847.7; 528/209, 176, 528/272; 522/104; 523/148, 501; 525/871; 360/134

See application file for complete search history.

(56) References Cited

U.S. PATENT DOCUMENTS

| | | | |
|---|---|---|---|
| 4,581,438 A | 4/1986 | Inata et al. | |
| 6,420,011 B1 | 7/2002 | Tsunekawa et al. | |
| 6,890,471 B2 | 5/2005 | Kobayashi et al. | |
| 8,017,715 B2* | 9/2011 | Kinoshita et al. | 528/209 |
| 2003/0059602 A1* | 3/2003 | Majumdar et al. | 428/329 |
| 2004/0028928 A1* | 2/2004 | Bennett et al. | 428/483 |
| 2005/0037155 A1* | 2/2005 | Shuto et al. | 428/1.1 |
| 2005/0170216 A1* | 8/2005 | Ejiri | 428/848 |
| 2005/0175866 A1* | 8/2005 | Ohno et al. | 428/845.6 |
| 2005/0238928 A1* | 10/2005 | Tomaru et al. | 428/847.1 |
| 2006/0083954 A1* | 4/2006 | Meguro et al. | 428/847 |
| 2009/0297888 A1* | 12/2009 | Horie et al. | 428/846.4 |
| 2010/0016539 A1* | 1/2010 | Kohno et al. | 528/209 |

FOREIGN PATENT DOCUMENTS

| | | |
|---|---|---|
| EP | 2045281 A1 | 4/2009 |
| JP | 60-135428 A | 7/1985 |
| JP | 60-221420 A | 11/1985 |
| JP | 61-145724 A | 7/1986 |
| JP | 6-145323 A | 5/1994 |
| JP | 11-1568 A | 1/1999 |
| JP | 2000-141475 A | 5/2000 |
| JP | 2000-355631 A | 12/2000 |
| WO | 02/47889 A1 | 6/2002 |
| WO | 2008/010607 A1 | 1/2008 |

OTHER PUBLICATIONS

International Search Report of PCT/JP2008/061072, mailing date of Sep. 9, 2008.
Notification of Transmittal of Translation of the International Preliminary Report on Patentability (Form PCT/IB/338) of International Application No. PCT/JP2008/061072 mailed Dec. 30, 2009 with Forms PCT/IB/373 and PCT/ISA/237.

* cited by examiner

Primary Examiner — Kevin M. Bernatz
Assistant Examiner — Louis Falasco
(74) Attorney, Agent, or Firm — Westerman, Hattori, Daniels & Adrian, LLP

(57) ABSTRACT

A biaxially oriented laminated polyester film which has excellent dimensional stability to environmental changes such as temperature and humidity variations and excellent flatness and windability. A biaxially oriented laminated polyester film comprising a film layer B on one side of a film layer A and having a surface roughness (RaB) on the film layer B side which is 1.0 nm or more larger than the surface roughness (RaA) on the film layer A side, wherein at least one of the film layers comprises an aromatic polyester (I) composed of a glycol component and a dicarboxylic acid component containing 5 mol % or more and less than 80 mol % of a recurring unit represented by the following formula (A):

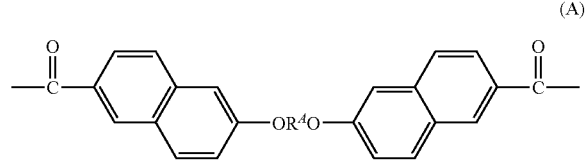

(A)

wherein $R^4$ is an alkylene group having 1 to 10 carbon atoms.

15 Claims, No Drawings

BIAXIALLY ORIENTED LAMINATED FILM

TECHNICAL FIELD

The present invention relates to a biaxially oriented laminated film consisting of films comprising an aromatic polyester copolymerized with a 6,6'-(alkylenedioxy)di-2-naphthoic acid.

BACKGROUND ART

Aromatic polyesters typified by polyethylene terephthalate and polyethylene-2,6-naphthalene carboxylate are widely used in films because they have excellent mechanical properties, dimensional stability and heat resistance. Especially polyethylene-2,6-naphthalene dicarboxylate has more excellent mechanical properties, dimensional stability and heat resistance than polyethylene terephthalate and is used in base films for high-density magnetic recording media which require dimensional stability. However, the requirement for dimensional stability in the high-density magnetic recording media is recently becoming higher and higher and the further improvement of their characteristic properties is desired.

Patent Documents 1 to 4 propose polyalkylene-6,6'-(alkylenedioxy)di-2-naphthoates obtained from a diethyl-6,6'-(alkylenedioxy)di-2-naphthoate which is an ester compound of a 6,6'-(alkylenedioxy)di-2-naphthoic acid. These documents present crystalline polyethylene-6,6'-(ethylenedioxy) di-2-naphthoates having a melting point of 294° C.

However, as the polyethylene-6,6'-(alkylenedioxy)di-2-naphthoates disclosed by these documents have a very high melting point and very high crystallinity, they have low fluidity in a molten state, making extrusion nonuniform at the time of forming a film, or their films are broken due to crystallization when they are stretched at a high draw ratio.

Patent Document 3 teaches that a magnetic recording flexible disk having little track slippage is obtained from a film of polyethylene-6,6'-(ethylenedioxy)di-2-naphthoate having a maximum temperature expansion coefficient of 10 to 35 (ppm/° C.), a maximum humidity expansion coefficient of 0 to 8.0 (ppm/% RH), a difference between the maximum and minimum temperature expansion coefficients of 0 to 6.0 (ppm/° C.) and a difference between the maximum and minimum humidity expansion coefficients of 0 to 4.0 (ppm/% RH).

In an Example of the above document, there is disclosed a film having a Young's modulus in the film forming direction of 485 kg/mm$^2$ (4.8 GPa) and a Young's modulus in the crosswise direction of 1,100 kg/mm$^2$ (10.9 GPa), a maximum temperature expansion coefficient of 19 (ppm/° C.), a minimum temperature expansion coefficient of 16.5 (ppm/° C.), a maximum humidity expansion coefficient of 6 (ppm/% RH), and a minimum humidity expansion coefficient of 4.5 (ppm/% RH).

However, since the requirement for the improvement of recording density in magnetic recording media is now very severe, and dimensional stability required for a base film cannot be attained by polyethylene terephthalate, polyethylene-2,6-naphthalene dicarboxylate and the film proposed by Patent Document 3.

More excellent surface properties such as traveling property and abrasion resistance are desired.
(Patent Document 1) JP-A 60-135428
(Patent Document 2) JP-A 60-221420
(Patent Document 3) JP-A 61-145724
(Patent Document 4) JP-A 6-145323

DISCLOSURE OF THE INVENTION

It is therefore an object of the present invention to provide a biaxially oriented laminated film which has excellent dimensional stability to environmental changes such as temperature and humidity variations and excellent flatness and windability. It is another object of the present invention to provide a biaxially oriented laminated film which rarely elongates when a load is applied thereto at a high temperature. It is still another object of the present invention to provide a biaxially oriented laminated film which hardly curls by a heat treatment. It is a further object of the present invention to provide a biaxially oriented laminated film which has few voids and excellent chipping resistance even when relatively large particles as compared with the thickness of a film layer are contained in the film.

In the biaxially oriented film, the humidity expansion coefficient ($\alpha h$) and the temperature expansion coefficient ($\alpha t$) have very close relationship with the Young's modulus. In general, as the Young's modulus becomes higher, the humidity expansion coefficient ($\alpha h$) and the temperature expansion coefficient ($\alpha t$) become lower. However, the Young's modulus cannot be increased indefinitely and there is limitation to the Young's modulus in order to secure film forming properties and a Young's modulus in the orthogonal direction.

A film comprising polyalkylene-6,6'-(alkylenedioxy)di-2-napthoate tends to present low humidity expansion coefficient ($\alpha t$), even when the Young's modulus is low.

However, looking at the above Patent Documents 1 to 4, a film comprising a polyalkylene-6,6'-(alkylenedioxy)di-2-naphthoate has a disadvantage that its Young's modulus in one direction can be made very high but the Young's modulus in the direction perpendicular to the above direction becomes very low. It has another disadvantage that its humidity expansion coefficient ($\alpha h$) is very low but its temperature expansion coefficient ($\alpha t$) is high. In the case of a film disclosed in Example 1 of Patent Document 3, its temperature expansion coefficient ($\alpha t$) is very high at 16.5 to 19 ppm/° C.

The inventors of the present invention have conducted intensive studies on the method of preventing a rise in the temperature expansion coefficient ($\alpha t$) by making use of the characteristic properties of a polyalkylene-6,6'-(alkylenedioxy)di-2-naphthoate having a low humidity expansion coefficient ($\alpha h$).

As a result, they have found that a film comprising an aromatic polyester (I) obtained by polymerizing a 6,6'-(alkylenedioxy)di-2-naphthoic acid and another aromatic carboxylic acid such as naphthalenedicarboxylic acid has excellent dimensional stability with a low humidity expansion coefficient ($\alpha h$) and a low temperature expansion coefficient ($\alpha t$). Further, they have found that, when a film comprising the aromatic polyester (I) is used as at least one layer, a laminated film having excellent dimensional stability, flatness and windability can be obtained.

They have also found that, when relatively large particles as compared with the thickness of a film layer B comprising the aromatic polyester (I) are contained in the film layer B, large projections are uniformly distributed, the formation of voids is suppressed, and a biaxially oriented laminated film having excellent chipping resistance is obtained. The present invention has been accomplished based on these findings.

That is, the present invention is a biaxially oriented laminated film (may be referred to as "laminated film" hereinafter) comprising a film layer B laminated on one side of a film layer A and having a surface roughness (RaB) on the film layer B side which is 1 nm or more larger than the surface roughness (RaA) on the film layer A side, wherein at least one of the film layers comprises an aromatic polyester (I) composed of a glycol component and a dicarboxylic acid component containing 5 mol % or more and less than 80 mol % of a unit represented by the following formula (A):

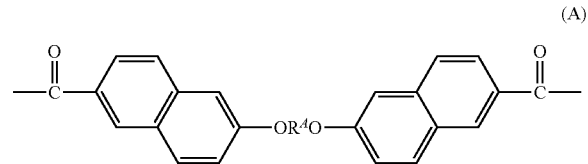
(A)

wherein $R^A$ is an alkylene group having 1 to 10 carbon atoms.

BEST MODE FOR CARRYING OUT THE INVENTION

>Aromatic Polyester (I)≦

In the present invention, at least one film layer comprises the aromatic polyester (I) composed of a glycol component and a dicarboxylic acid component containing 5 mol % or more and less than 80 mol % of a unit represented by the following formula (A):

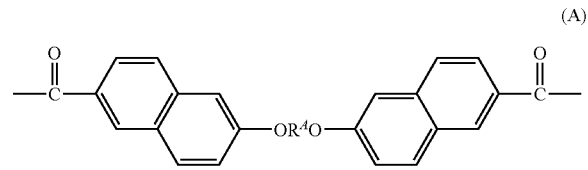
(A)

wherein $R^A$ is an alkylene group having 1 to 10 carbon atoms.
(Unit Represented by Formula (A))

The unit represented by the formula (A) is derived from a 6,6'-(alkylenedioxy)di-2-naphthoic acid (may be referred to as ANA hereinafter).

When the content of ANA in the dicarboxylic acid component is less than 5 mol %, the effect of reducing the humidity expansion coefficient ($\alpha h$) is hardly obtained. The content of ANA should be less than 80 mol % from the viewpoint of moldability. Surprisingly, the effect of reducing the humidity expansion coefficient ($\alpha h$) by ANA is obtained very efficiently with a small amount of ANA and becomes almost saturated when the content of ANA is 50 mol %. From this point of view, the upper limit of the content of ANA in the dicarboxylic acid component is preferably 45 mol %, more preferably 40 mol %, much more preferably 35 mol %, particularly preferably 30 mol %. The lower limit of the content of ANA in the dicarboxylic acid component is preferably 5 mol %, more preferably 7 mol %, much more preferably 10 mol %, particularly preferably 15 mol %.

By using an aromatic polyester containing a specific amount of ANA in at least one film layer, a film having a low temperature expansion coefficient ($\alpha t$) and a low humidity expansion coefficient ($\alpha h$) can be obtained.

$R^A$ in the formula (A) is an alkylene group having 1 to 10 carbon atoms. Examples of the alkylene group include ethylene group, propylene group, isopropylene group, trimethylene group, tetramethylene group, hexamethylene group and octamethylene group.

The formula (A) is preferably a unit derived from 6,6'-(ethylenedioxy)di-2-naphthoic acid, 6,6'-(trimethylenedioxy)di-2-naphthoic acid or 6,6'-(butylenedioxy)di-2-naphthoic acid. Out of these, a unit represented by the formula (A) in which the number of carbon atoms of $R^A$ is even is preferred, and a unit derived from 6,6'-(ethylenedioxy)di-2-naphthoic acid is particularly preferred from the viewpoint of the effect of the present invention.
(Another Dicarboxylic Acid Component)

A unit represented by the following formula (B) is preferred as a unit except for the unit represented by the formula (A) contained in the dicarboxylic acid component.

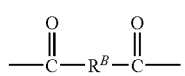
(B)

In the formula (B), $R^B$ is a phenylene group or naphthalenediyl group. The unit represented by the formula (B) is derived from terephthalic acid, isophthalic acid, 2,6-naphthalenedicarboxylic acid or 2,7-naphthalenedicarboxylic acid. Units derived from terephthalic acid and 2,6-naphthalenedicarboxylic acid are preferred, and a unit derived from 2,6-naphthalenedicarboxylic acid is particularly preferred from the viewpoint of the mechanical properties of the obtained film.

The content of the unit represented by the formula (B) in the dicarboxylic acid component is more than 20 mol % and 95 mol % or less. The lower limit of the content of the unit represented by the formula (B) in the dicarboxylic acid component is preferably 55 mol %, more preferably 60 mol %, much more preferably 65 mol %, particularly preferably 70 mol %. The upper limit of the content of the unit represented by the formula (B) in the dicarboxylic acid component is preferably 95 mol %, more preferably 93 mol %, much more preferably 90 mol %, particularly preferably 85 mol %.

Therefore, the aromatic polyester (I) preferably contains 5 mol % or more and less than 80 mol % of a unit represented by the formula (A) and more than 20 mol % and 95 mol % or less of a unit represented by the following formula (B) as a dicarboxylic acid component.

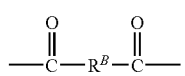
(B)

wherein $R^B$ is a phenylene group or naphthalenediyl group.
(Diol Component)

The diol component preferably contains 90 to 100 mol % of a unit represented by the following formula (C). The content of the unit represented by the formula (C) is preferably 95 to 100 mol %, more preferably 98 to 100 mol %.

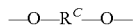
(C)

In the formula (C), $R^C$ is an alkylene group having 2 to 10 carbon atoms. Examples of the alkylene group as $R^C$ include ethylene group, propylene group, isopropylene group, trimethylene group, tetramethylene group, hexamethylene group and octamethylene group. Out of these, units derived from ethylene glycol, trimethylene glycol, tetramethylene glycol and cyclohexanedimethanol are preferred as the unit represented by the formula (C). The content of the unit derived from ethylene glycol in the diol component is preferably 90 mol % or more, more preferably 90 to 100 mol %, much more preferably 95 to 100 mol %, most preferably 98 to 100 mol %.

Another diol component may be contained in addition to the diol component represented by the formula (C). The content of the another diol component is preferably 0 to 10 mol %, more preferably 0 to 5 mol %, much more preferably 0 to 2 mol %. Examples of the another diol component are those enumerated for the diol component represented by the formula (C). For example, when the diol component of the formula (C) is a unit derived from ethylene glycol, the another diol component is a unit except for the unit derived from ethylene glycol.

The content of the ester unit (-(A)-(C)—) composed of the unit represented by the formula (A) and the unit represented by the formula (C) is preferably 5 mol % or more and less than 50 mol %, more preferably 5 to 45 mol %, much more preferably 10 to 40 mol % based on the total of all the units.

Polyalkylene terephthalate units such as polyethylene terephthalate, polytrimethylene terephthalate and polybutylene terephthalate and polyalkylene-2,6-naphthalene dicarboxylate units such as polyethylene-2,6-naphthalene dicarboxylate, polytrimethylene-2,6-naphthalene dicarboxylate and polybutylene-2,6-naphthalene dicarboxylate are preferred as other ester units. Out of these, ethylene terephthalate and ethylene-2,6-naphthalene dicarboxylate units are preferred, and an ethylene-2,6-naphthalene dicarboxylate unit is particularly preferred from the viewpoint of mechanical properties.

Therefore, the unit represented by the formula (A) is preferably a polyester represented by the following formula (A-1).

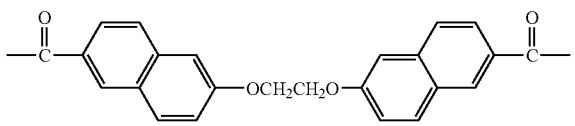

(A-1)

A polyester comprising a dicarboxylic acid component containing 10 to 40 mol % of the unit represented by the formula (A) and 90 to 60 mol % of a unit represented by the following formula (B-1) is preferred.

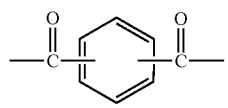

(B-1)

A polyester comprising a dicarboxylic acid component containing 5 to 45 mol % of the unit represented by the formula (A) and 95 to 55 mol % of a unit represented by the following formula (B-2) is preferred.

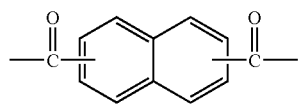

(B-2)

The melting point of the aromatic polyester (I) measured by DSC is preferably 200 to 260° C., more preferably 210 to 255° C., much more preferably 220 to 253° C. When the melting point exceeds the above upper limit, the melt viscosity of the aromatic polyester (I) becomes high, whereby fluidity deteriorates at the time of molding by melt extrusion with the result that delivery may become nonuniform and film formability may degrade. When the melting point falls below the lower limit, though film formability is excellent, the mechanical properties of the aromatic polyester (I) are apt to be impaired. In general, when the melting point of an aromatic polyester is reduced by copolymerizing another acid component, the mechanical properties of the aromatic polyester deteriorate. However, as the film formability of the aromatic polyester (I) used in the present invention is improved by copolymerization, a film obtained from the aromatic polyester (I) has the same mechanical properties as a homopolymer consisting of the unit represented by the formula (A) described in Patent Document 2. The melting point can be adjusted by the types and amounts of comonomers and controlling a dialkylene glycol as a by-product.

The glass transition temperature (may be referred to as Tg hereinafter) of the aromatic polyester (I) measured by DSC is preferably 90 to 120°, more preferably 95 to 119° C., much more preferably 100 to 117° C. When Tg falls within this range, a film having excellent heat resistance and dimensional stability is obtained. The glass transition temperature can be adjusted by the types and amounts of comonomers and controlling a dialkylene glycol as a by-product.

The intrinsic viscosity of the aromatic polyester (I) measured at 35° C. in a mixed solvent of p-chlorophenol/1,1,2,2-tetrachloroethane (weight ratio of 40/60) is preferably 0.4 to 1.5 dl/g, more preferably 0.5 to 1.3 dl/g.

<Production of Aromatic Polyester (I)>

The method of producing the aromatic polyester (I) will be described hereinbelow. First, a dicarboxylic acid component containing a 6,6'-(alkylenedioxy)di-2-naphthoic acid or an ester forming derivative thereof and a glycol component are reacted with each other to produce a polyester precursor. The aromatic polyester (I) can be produced by polymerizing the obtained polyester precursor in the presence of a polymerization catalyst. Solid-phase polymerization may be carried out as required.

In the step of producing the above polyester precursor, the glycol component is used in an amount preferably 1.1 to 6 times, more preferably 2 to 5 times, particularly preferably 3 to 5 times larger than the total number of moles of all the dicarboxylic acid components from the viewpoint of productivity.

The reaction for producing the polyester precursor is carried out at preferably a temperature equal to or higher than the boiling point of ethylene glycol, particularly preferably 190 to 250° C. At a temperature lower than 190° C., the reaction hardly proceeds completely and at a temperature higher than 250° C., diethylene glycol as a by-product is readily produced. Although the reaction may be carried out under normal pressure, it should be carried out under increased pressure to improve productivity. More specifically, the reaction pressure is 10 to 200 kPa in terms of absolute pressure, the reaction temperature is generally 150 to 250° C., preferably 180 to 230° C., and the reaction time is 10 minutes to 10 hours, preferably 30 minutes to 7 hours. A reaction product as the polyester precursor is obtained by this esterification reaction.

In the reaction step for producing the polyester precursor, a known esterification or transesterification catalyst may be used. Examples of the catalyst include alkali metal compounds, alkali earth metal compounds and titanium compounds.

A description is subsequently given of a polycondensation reaction. The polycondensation temperature is preferably 230 to 280° C. which is equal to or higher than the melting point of the obtained polymer, more preferably a temperature 5° C. or more higher than the melting point to a temperature 30° C. higher than the melting point. In general, the polycondensation reaction is preferably carried out under a reduced pressure of 30 Pa or less. When the pressure is higher than 30 Pa, the time required for the polycondensation reaction becomes long and it is difficult to obtain the aromatic polyester (I) having a high degree of polymerization.

The polycondensation catalyst is a metal compound containing at least one metal element. The polycondensation catalyst may be used in the esterification reaction. Examples of the metal element include titanium, germanium, antimony, aluminum, nickel, zinc, tin, cobalt, rhodium, iridium, zirconium, hafnium, lithium, calcium and magnesium. Out of these, titanium, germanium, antimony, aluminum and tin are more preferred, and a titanium compound is particularly preferred because it has high activity in both the esterification reaction and the polycondensation reaction.

These catalysts may be used alone or in combination. The amount of the catalyst is preferably 0.001 to 0.5 mol %, more preferably 0.005 to 0.2 mol % based on the total number of moles of all the recurring units of the aromatic copolyester.

Examples of the titanium compound as the polycondensation catalyst include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, orthoester or condensation orthoester of titanium, reaction product of an orthoester or condensation orthoester of titanium and hydroxycarboxylic acid, reaction product of an orthoester or condensation orthoester of titanium, hydroxycarboxylic acid and phosphorus compound, and reaction product of an orthoester or condensation orthoester of titanium and a polyhydric alcohol having at least two hydroxyl groups, 2-hydroxycarboxylic acid or a base.

(Additives)

The aromatic polyester (I) may optionally contain another thermoplastic polymer, stabilizer such as ultraviolet absorbent, antioxidant, plasticizer, lubricant, flame retardant, release agent, pigment, nucleating agent, filler or glass fiber, carbon fiber and lamellar silicate as long as the effect of the present invention is not impaired. Examples of the another thermoplastic polymer include aliphatic polyester-based resin, polyamide-based resin, polycarbonate, ABS resin, polymethyl methacrylate, polyamide-based elastomer, polyester-based elastomer, polyether imide and polyimide.

<Aromatic Polyester (II)>

At least one film layer of the laminated film of the present invention comprises the aromatic polyester (I). The other film layer may comprise an aromatic polyester (may be referred to as "aromatic polyester (II)" hereinafter) except for the aromatic polyester (I).

The aromatic polyester (II) preferably contains 90 to 100 mol % of a unit represented by the following formula (B) as a dicarboxylic acid component and a unit represented by the following formula (C) as a diol component.

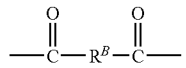
(B)

wherein $R^B$ is a phenylene group or naphthalenediyl group.

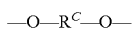
(C)

wherein $R^C$ is an alkylene group having 2 to 10 carbon atoms.

Examples of the aromatic polyester (II) include alkylene terephthalates such as polyethylene terephthalate, polytrimethylene terephthalate and polybutylene terephthalate. Alkylene-2,6-naphthalene dicarboxylates such as polyethylene-2,6-naphthalene dicarboxylate, polytrimethylene-2,6-naphthalene dicarboxylate and polybutylene-2,6-naphthalene dicarboxylate are also included. Out of these, polyethylene terephthalate and polyethylene-2,6-naphthalene dicarboxylate are preferred, and polyethylene-2,6-naphthalene dicarboxylate is particularly preferred from the viewpoint of mechanical properties. The aromatic polyester (II) may contain another comonomer as long as the effect of the present invention is not impaired. The aromatic polyester (II) may contain additives like the aromatic polyester (I). The aromatic polyester (II) produced by a method known per se can be advantageously used.

<Laminated Film>

The laminated film of the present invention has a film layer B laminated on one side of a film layer A. At least one film layer of the laminated film of the present invention comprises the aromatic polyester (I). As a matter of course, the film layer A and the film layer B preferably comprise the aromatic polyester (I) from the viewpoint of dimensional stability to environmental changes. To improve dimensional stability to environmental changes, the aromatic polyester (I) is preferably used in a thicker film layer. The present invention includes a laminated film having the film layer A comprising the aromatic polyester (II) and the film layer B comprising the aromatic polyester (I).

(Film Layer B)

The surface roughness (RaB) of the film layer B is preferably 5 to 15 nm, more preferably 5 to 10 nm, much more preferably 6 to 8 nm. When the surface roughness (RaB) of the film layer B is set to this range, excellent windability can be provided to the obtained laminated film.

The surface roughness (RaB) of the film layer B is 1 nm or more, preferably 2 nm or more, more preferably 3 nm or more larger than the surface roughness (RaA) of the film layer A. When the difference between the surface roughness RaA and the surface roughness RaB is set to the lower limit or more, excellent flatness and windability can be provided to the film at high level as compared with a single-layer film. The upper limit of the difference between RaA and RaB is not particularly limited but 8 nm or less, preferably 5 nm or less, more preferably 4 nm or less to prevent the surface of the film layer A from being marred by the film layer B.

To increase the surface roughness of a film, inert particles are contained in a film layer which is to be roughened to form projections. Examples of the inert particles to be contained in the film layer B include (1) organic polymer particles (for example, particles of crosslinked silicone resin, crosslinked polystyrene, crosslinked acrylic resin, melamine-formaldehyde resin, aromatic polyamide resin, polyimide resin, polyamide-imide resin and crosslinked polyesters). (2) Particles of inorganic compounds such as metal oxides (for example, aluminum oxide, titanium dioxide, silicon dioxide (silica), magnesium oxide, zinc oxide and zirconium oxide), metal carbonates (for example, magnesium carbonate and calcium carbonate), metal sulfates (for example, calcium sulfate and barium sulfate), carbons (for example, carbon black, graphite and diamond), and clay minerals (for example, kaolin, clay and bentonite) are also included. (3) Externally added particles which are added in a particulate state such as core-shell type composite particles comprising a core and a shell made of different materials are further included. (4) Internally precipitated particles formed by the precipitation of a catalyst are still further included.

Out of these, at least one type of particles selected from the group consisting of crosslinked silicone resin, crosslinked acrylic resin, crosslinked polyester, crosslinked polystyrene, aluminum oxide, titanium dioxide, silicon dioxide, kaolin and clay are preferred. At least one type of particles selected from the group consisting of crosslinked silicone resin, crosslinked acrylic resin, crosslinked polyester, crosslinked polystyrene and silicon dioxide (excluding porous silica) are particularly preferred because variations in the particle diameter of the particles can be easily reduced. As a matter of course, two or more different types of particles may be used.

The average particle diameter of the inert particles to be contained in the film layer B is preferably 0.05 to 1.0 μm, more preferably 0.1 to 0.8 μm. When the film is used in a magnetic recording medium, the average particle diameter is in the range of preferably 0.1 to 0.5 μm, more preferably 0.1 to 0.3 μm. The content of the inert particles to be contained in the film layer B is preferably 0.1 to 1.0 wt %, more preferably 0.15 to 0.5 wt % based on the weight of the film layer B. Particularly when the film is used in a magnetic recording medium, the content of the inert particles is preferably 0.2 to 0.4 wt %, more preferably 0.2 to 0.3 wt %.

The thickness of the film layer B is preferably 50 to 90%, more preferably 55 to 85%, much more preferably 60 to 80% of the total thickness of the laminated film. Since the film layer B has a larger surface roughness than that of the film layer A, it contains larger particles than those of the film layer A or more particles than the film layer A. The fall-off of the particles can be more easily suppressed by setting the thickness of the film layer B to a value larger than the lower limit. When a portion which does not become a product and is produced at the time of forming a laminated film is collected and recycled, a large amount of the collected polymer (collected chips) can be used in the film layer B by setting the thickness of the film layer B to a value larger than the lower limit, thereby making it possible to cut down the film cost. When the collected chips are used in the film layer A, large particles cannot be contained only in the film layer B, thereby making it difficult to control the surface roughness, or impairing the flatness of the film layer A. When the thickness of the film layer B exceeds the upper limit, the thickness of the film layer A becomes very small, whereby the particles in the film layer B have an influence upon the film layer A with the result that the surface may become rough and electromagnetic conversion characteristics may deteriorate. From the viewpoint of dimensional stability, the aromatic polyester (I) is preferably used in a thicker film layer. Therefore, the aromatic polyester (I) is preferably used in the film layer B.

In the laminated film of the present invention, it is preferred that the film layer B should comprise the aromatic polyester (I) and particles having an average particle diameter of not less than 50 nm and should contain particles B whose average particle diameter (dB) satisfies the following expression (1) with respect to the thickness (tB) of the film layer B as particles having the largest average particle diameter.

$$0.2 \leq tB/dB \leq 10 \tag{1}$$

When the film layer B contains the particles B which satisfies the expression (1), the relatively large projections of the film layer B can be made uniform.

tB/dB is preferably 1 to 7, more preferably 1 to 4. When tB/dB falls below the above range, the thickness (tB) of the film layer B becomes too small or the particle diameter of the particles becomes too large as compared with the thickness of the film layer B, whereby the particles B readily falloff from the film layer B. When tB/dB exceeds the above range, the thickness (tB) of the film layer B becomes too large or the particle diameter of the particles becomes too small as compared with the thickness of the film layer B, whereby the projections are hardly made uniform in height, the ratio of the thickness of the film layer B to the total thickness of the biaxially oriented laminated film becomes large, and the surface of the film layer A is apt to become rough.

Examples of the particles B are preferably those enumerated for the above inert particles. The particles B are preferably of at least one type selected from the group consisting of silica particles and organic polymer particles. The organic polymer particles are preferably of at least one type selected from the group consisting of silicone resin particles and crosslinked polystyrene particles.

As a matter of course, the film layer B should contain the above particles B and may contain other particles as long as the effect of the present invention is not impaired. Whether the film layer B in the present invention contains a plurality types of particles or not can be confirmed and judged from a particle size distribution obtained by measuring the average particle diameter which will be described hereinafter. For example, when a particle size distribution is drawn by plotting the frequency on the longitudinal axis and the particle diameter on the horizontal axis, two peaks are observed, and there are valleys whose height is smaller than half of the maximum height of each peak, it can be said that two different types of particles are used. In the present invention, the average particle diameters of these particles are obtained from the particle diameters of particles forming these peaks with the valleys as boundaries thereof.

The average particle diameter of the particles B is preferably 0.05 to 1.0 μm, more preferably 0.1 to 0.8 μm. When the film is used in a magnetic recording medium, the average particle diameter is preferably 0.1 to 0.6 μm, more preferably 0.2 to 0.4 μm. The content of the particles B is preferably 0.001 to 1.0 wt %, more preferably 0.005 to 0.8 wt % based on the weight of the film B. Particularly when the film is used in a magnetic recording medium, the content is preferably 0.01 to 0.5 wt %, more preferably 0.01 to 0.3 wt %.

The film layer B of the present invention preferably has a small thickness as compared with the total thickness of the biaxially oriented laminated film in order to prevent the surface of the film layer A from being roughened by the tossing of the film layer A by the particles contained in the film layer B. From this point of view, the film layer B is preferably thinner than the film layer A. The thickness of the film layer B is preferably 0.005 to 3 μm, more preferably 0.05 to 2.0 particularly preferably 0.1 to 1.5 μm from the relationship with the average particle diameter of the above-described particles B contained in the film layer B.

The surface roughness (RaB) of the film layer B is preferably in the range of 5 to 10 nm.

(Film Layer A)

The surface roughness (RaA) of the film layer A is preferably 1 to 7 nm, more preferably 1.5 to 5 nm, much more preferably 2 to 4 nm. When the surface roughness (RaA) of the film layer A falls within this range, excellent flatness can be provided to the obtained laminated film.

The film layer A does not contain or may contain inert particles. When it contains inert particles, the average particle diameter of the inert particles is preferably 0.01 to 0.3 μm, more preferably 0.05 to 0.25 μm. Particularly when the film is used in a magnetic recording medium, the average particle diameter of the inert particles is preferably 0.1 to 0.2 μm, more preferably 0.1 to 0.15 μm. The content of the inert particles in the film layer A is preferably 0.005 to 0.3 wt %, more preferably 0.01 to 0.2 wt % based on the weight of the film layer A. Particularly when the film is used in a magnetic recording medium, the content is preferably 0.05 to 0.15 wt %. Examples of the inert particles to be contained in the film layer A are the same as those to be contained in the film layer B.

(Young's Modulus)

When the laminated film of the present invention is used as a base film for magnetic tapes, it preferably has a Young's modulus in at least one direction within the plane of the film of 6.0 GPa or more to prevent the elongation of the base film. In addition, the humidity expansion coefficient ($\alpha h$) can be made low by setting this high Young's modulus. Although the upper limit of the Young's modulus is not limited, it is generally 11 GPa. The Young's modulus in the longitudinal direction of the laminated film is preferably 4 to 11 GPa, more preferably 5 to 10 GPa, much more preferably 5.5 to 9 GPa. The Young's modulus in the transverse direction of the film is preferably 5 to 11 GPa, more preferably 6 to 11 GPa, much more preferably 7 to 10 GPa, particularly preferably 8 to 10 GPa.

(Temperature Expansion Coefficient: $\alpha t$)

Preferably, the laminated film of the present invention has a temperature expansion coefficient ($\alpha t$) in at least one direction, preferably the transverse direction of the film of not more than 10 ppm/° C., from viewpoint of excellent dimensional stability obtained. When the temperature expansion coefficient ($\alpha t$) in at least one direction of the film is not more than 10 ppm/° C., excellent dimensional stability to environmental changes can be obtained. It is estimated from the results of Patent Document 3 that when an alkylene-6,6'-(alkylenedioxy)di-2-naphthoic acid is copolymerized, the temperature expansion coefficient ($\alpha t$) becomes high. However, when a specific amount of an alkylene-6,6'-(alkylenedioxy)di-2-naphthoic acid is copolymerized and the obtained copolymer is stretched, surprisingly, the temperature expansion coefficient ($\alpha t$) can be made low. The lower limit of the temperature expansion coefficient ($\alpha t$) is not particularly limited but generally −15 ppm/° C. The temperature expansion coefficient ($\alpha t$) is preferably −10 to 10 ppm/° C., more preferably −7 to 7 ppm/° C., much more preferably −5 to 5 ppm/° C. When the temperature expansion coefficient ($\alpha t$) falls within this range and the film of the present invention is used in a magnetic recording tape, excellent dimensional stability to a dimensional change by ambient temperature and humidity variations can be obtained advantageously.

(Humidity Expansion Coefficient: $\alpha h$)

The laminated film of the present invention preferably has a humidity expansion coefficient ($\alpha h$) in at least one direction, preferably a direction which satisfies the relationship with the temperature expansion coefficient ($\alpha t$) in the transverse direction of the film of preferably 3 to 7 ppm/% RH, more preferably 3 to 6 ppm/% RH. When $\alpha h$ falls within this range, the dimensional stability of a magnetic recording tape obtained from the film of the present invention becomes excellent. Particularly when the film of the present invention is used as a base film for a magnetic recording tape, it is preferred that the direction having a lower humidity expansion coefficient ($\alpha h$) should be the transverse direction of the laminated film because track slippage can be suppressed completely. In the present invention, the transverse direction of the film is a direction perpendicular to the film forming direction (may be referred to as "longitudinal direction" or "vertical direction") of the film and may be referred to as "crosswise direction".

As for the direction in which the temperature expansion coefficient ($\alpha t$) is not more than 10 ppm/° C., at least one direction, preferably the transverse direction may satisfy the above relationship, and the direction perpendicular to the transverse direction preferably has the same temperature expansion coefficient ($\alpha t$), humidity expansion coefficient ($\alpha h$) and Young's modulus as above from the viewpoint of dimensional stability.

In the case of a magnetic recording tape having a magnetic layer on only one side out of magnetic recording media, as excellent windability is easily obtained while the magnetic layer is made flat, it is preferred that the magnetic layer should be formed on the surface of the film layer A and the surface of the film layer B should be made a traveling surface.

(Laminated Film Comprising Aromatic Polyester (II))

In the biaxially oriented laminated film of the present invention, it is preferred as described above that the both layers should comprise the aromatic polyester (I) from the viewpoint of temperature and humidity expansion coefficients. However, one of the layers may comprise the aromatic polyester (I) and the other layer may comprise the aromatic polyester (II). When one layer comprises the aromatic polyester (I) and the other layer comprises the aromatic polyester (II), the peak temperature of high-temperature side tan $\delta$ is preferably 135° C. or higher in the measurement of viscoelasticity in the film forming direction. When the peak temperature of high-temperature side tan $\delta$ is 135° C. or higher, elongation in the tension application direction at the time of processing at a high temperature of about 120° C. can be suppressed, thereby making it possible to prevent creasing after processing.

To increase the peak temperature of tan $\delta$, an aromatic polyester having a Tg (glass transition temperature) measured by DSC of 110° C. or higher should be selected as the aromatic polyester (II) and conditions under which the molecular chain is aligned in the film forming direction should be selected. The lower limit of the glass transition temperature of the aromatic polyester (II) is preferably 110° C. or higher, more preferably 115° C. or higher. The upper limit is not particularly limited but preferably 170° C. or lower, more preferably 150° C. or lower from the viewpoint of film formability when the layer is laminated with the film layer (B).

From this point of view, the aromatic polyester (II) is preferably polyethylene-2,6-naphthalene dicarboxylate comprising ethylene-2,6-naphthalene dicarboxylate in an amount of not less than 95 mol % of the total of all the recurring units, more preferably a copolymer or blend comprising a component which can increase Tg. The aromatic polyester (II) may be polyethylene terephthalate comprising ethylene terephthalate as the main recurring unit. However, in the case of polyethylene terephthalate, if it is a homopolymer, it is difficult to satisfy the above tan $\delta$ unlike the above-described polyethylene-2,6-naphthalene dicarboxylate. Therefore, it is preferred that a comonomer which can increase the glass transition temperature should be copolymerized, or a polyether imide or liquid crystal resin should be blended (refer to JP-A 2000-355631, JP-A 2000-141475 and JP-A 11-1568).

As for lamination with film layers comprising the aromatic polyester (II), a multi-layer laminated film composed of 11 or more alternating layers which consist of film layers comprising the aromatic polyester (II) and film layers comprising the aromatic polyester (I) is preferred because curling can be suppressed more. The preferred total number of the both layers is 31 to 10,001, more preferably 51 to 1,001 from the viewpoints of the uniformity of layer constitution and the development of an effect. When the number of layers is smaller than the lower limit, curling is hardly suppressed. The upper limit of the number of layers is not particularly limited but preferably smaller than the above upper limit because the laminated structure is easily maintained. The thickness of each layer is preferably 0.1 to 1,000 nm, more preferably 1 to 100 nm from the viewpoints of the uniformity of layer constitution and the development of an effect.

<Method of Producing Laminated Film>

The laminated film of the present invention is stretched in the film forming direction and the transverse direction to enhance molecular orientation in these directions. The laminated film of the present invention is preferably produced, for example, by the following method to improve its Young's modulus while maintaining film formability.

First, the aromatic polyesters (at least one of them is the aromatic polyester (I)) for the film layers A and B are dried and laminated together in a die while they are molten, and the resulting laminate is extruded into a film form. Alternatively, they are extruded from a die into a sheet form while they are molten and then laminated together. The melting temperature is preferably the melting point (Tm: ° C.) of the polyester for forming each layer to (Tm+70)° C. After extrusion, the obtained laminate is solidified by quenching to obtain a laminated unstretched film which is then stretched biaxially.

Cooling with a cooling drum is preferably carried out very swiftly to achieve the Young's moduli in the both directions as well as αt and αh specified by the present invention and facilitate subsequent stretching. From this point of view, cooling with a cooling drum is preferably carried out not at a high temperature of 80° C. as disclosed in the Patent Document 3 but at a low temperature of 20 to 60° C. By cooling at such a low temperature, the crystallization of the unstretched film is suppressed, making it possible to carry out the subsequent stretching step smoothly.

Biaxial stretching may be sequential or simultaneous biaxial stretching. In this text, a method of manufacturing the film of the present invention by stretching the unstretched film in the longitudinal direction and then in the transverse direction sequentially and heat setting it in this order will be described as an example. Preferably, the unstretched film is first stretched to 3 to 8 times in the longitudinal direction at the glass transition temperature (Tg: ° C.) of the polyester forming each film layer to (Tg+40)° C. and then to 3 to 8 times in the transverse direction at (Tg+10) to (Tg+50)° C. which is higher than the above stretching temperature in the longitudinal direction and further heat set at a temperature lower than the melting point of the polymer, i.e., (Tg+50) to (Tg+150)° C. for 1 to 20 seconds. In order to form uniform projections and increase dimensional stability, heat setting is preferably carried out at preferably 180 to 220° C., more preferably 190 to 210° C. for 1 to 15 seconds.

Sequential biaxial stretching has been described above. However, the laminated film of the present invention may be produced by simultaneous biaxial stretching in which longitudinal stretching and transverse stretching are carried out at the same time with reference to the draw ratios and the stretching temperatures which have been described above.

The thickness of the laminated film of the present invention may be suitably determined according to application purpose. When the laminated film is used as a base film for magnetic recording tapes, its thickness is preferably 2 to 10 µm, more preferably 3 to 7 µm, particularly preferably 4 to 6 µm.

The particles may be contained by a method known per se. For example, in the production process of a polyester, the particles may be added to a reaction system or added to the polyester by melt kneading. From the viewpoint of the dispersibility of the particles, the particles are preferably added to the reaction system of the polyester to produce a polyester composition having a high concentration of the particles as a master polymer which is then mixed with a polyester composition containing no particles or having a low concentration of the particles.

Since the biaxially oriented laminated film of the present invention is excellent in dimensional stability, flatness, windability and chipping resistance, rarely elongates by heating and has excellent curl resistance, it can be used as a base film for magnetic recording media. That is, according to the present invention, there is provided a magnetic recording tape which comprises the laminated film of the present invention as a base film, a non-magnetic layer and a magnetic layer on the surface of the film layer A in this order, and a back coat layer on the surface of the film layer B.

EXAMPLES

The following examples and comparative examples are provided to further illustrate the present invention. In the present invention, the characteristic properties of the examples and the comparative examples were measured and evaluated by the following methods.

(1) Intrinsic Viscosity

The intrinsic viscosity of the obtained aromatic polyester was measured at 35° C. by dissolving the polymer in a mixed solvent of p-chlorophenol/1,1,2,2-tetrachloroethane (weight ratio of 40/60).

(2) Glass Transition Point and Melting Point

The glass transition point and the melting point were measured by DSC (Trade name: Thermal lyst2100 of TA Instruments Co., Ltd.) at a temperature elevation rate of 20° C./min.

(3) Copolymerization Ratio

As for a glycol component, 10 mg of a sample was dissolved in 0.5 ml of a mixed solution of p-chlorophenol and 1,1,2,2-tetrachloroethane (volume ratio of 3:1) at 80° C. Isopropylamine was added to and fully mixed with the resulting solution, and the amount of the glycol component was measured at 80° C. by 600 M $^1$H-NMR (JEOL A600 of Hitachi Electron Co., Ltd.).

As for an aromatic dicarboxylic acid component, 50 mg of the sample was dissolved in 0.5 ml of a mixed solution of p-chlorophenol and 1,1,2,2-tetrachloroethane (volume ratio of 3:1) at 140° C., and the amount of the aromatic dicarboxylic acid component was measured at 140° C. by 400M 13C-NMR (JEOL A600 of Hitachi Electron Co., Ltd.).

(4) Young's Modulus

A sample having a width of 10 mm and a length of 15 cm was cutout from the obtained film and pulled by a universal tensile tester (Trade Name: Tensilon of Toyo Baldwin Co., Ltd.) at a chuck interval of 100 mm, a pulling rate of 10 mm/min and a chart rate of 500 mm/min. The Young's modulus was calculated from the tangent of a rising portion in the obtained load-elongation curve.

(5) Temperature Expansion Coefficient (αt)

A sample having a length of 15 mm and a width of 5 mm was cut out from the obtained film to ensure that the film forming direction or crosswise direction of the film became the measurement direction, set in the TMA3000 of Shinkuu Riko Co., Ltd., pre-treated in a nitrogen atmosphere (0% RH) at 60° C. for 30 minutes and then cooled to room temperature. Thereafter, the sample was heated from 25° C. to 70° C. at a temperature elevation rate of 2° C./min to measure the length of the sample at each temperature in order to calculate its temperature expansion coefficient (αt) from the following equation. The measurement direction was the longitudinal direction of the obtained sample, and the measurement was made 5 times to obtain the average value of the measurement data.

$$\alpha t = \{(L60-L40)\}/(L40 \times \Delta T)\} + 0.5$$

In the above equation, L40 is the length (mm) of the sample at 40° C., L60 is the length (mm) of the sample at 60° C., ΔT is 20 (=60−40)° C., and 0.5 is the temperature expansion coefficient (ppm/° C.) of quartz glass.

(6) Humidity Expansion Coefficient (αh)

A sample having a length of 15 mm and a width of 5 mm was cut out from the obtained film to ensure that the film forming direction or crosswise direction of the film became the measurement direction and set in the TMA3000 of Shinkuu Riko Co., Ltd. to measure the length of the sample at a humidity of 30% RH and 70% RH in a 30° C. nitrogen atmosphere so as to calculate its humidity expansion coefficient (αh) from the following equation. The measurement direction was the longitudinal direction of the obtained sample, and the measurement was made 5 times to obtain the average value of the measurement data as ah.

$$\alpha h = (L70 - L30)/(L30 \times \Delta H)$$

In the above equation, L30 is the length (mm) of the sample at 30% RH, L70 is the length (mm) of the sample at 70% RH, and ΔH is 40 (=70−30) % RH.

(7) Center Plane Average Roughness (Ra)

The center plane average roughness Ra was obtained from the following equation with surface analyzing software incorporated in the non-contact 3-D surface structure analyzing microscope (NewView 5022) of Zygo Corporation at a measurement magnification of 25× and a measurement area of 283 μm×213 μm (=0.0603 mm$^2$).

$$Ra = \sum_{k=1}^{M} \sum_{j=1}^{N} |Z_{jk} - \overline{Z}|/(M \cdot N)$$

wherein $$\overline{Z} = \sum_{k=1}^{M} \sum_{j=1}^{N} Z_{jk}/(M \cdot N)$$

Zjk is a height in a 2-D roughness chart at a coordinate position of a j-th section and a k-th section in the measurement direction (283 μm) and a direction (213 μm) perpendicular to the measurement direction both of which are divided into M sections and N sections, respectively.

(8) Windability

A film roll obtained by slitting a film at a slit rate of 60 m/min and a slit width of 1,000 mm and winding a 8,000 m film was observed to evaluate its windability based on the following criteria.

⊚: no crease is seen
○: a small number of creases are seen but there is no practical problem
X: many creases are seen (9) Electromagnetic Conversion Characteristics A ½-inch linear system having a fixed head was used to measure electromagnetic conversion characteristics. An electromagnetic induction head (track width of 25 μm, gap of 0.1 μm) was used for recording and an MR head (8 μm) was used for reproduction. The relative speed of the head and the tape was 10 m/sec, a signal having a recording wavelength of 0.2 μm was recorded, the frequency of a reproduction signal was analyzed by a spectrum analyzer, the ratio of the output C of a carrier signal (wavelength of 0.2 μm) to the integral noise N of all the spectral area was taken as C/N ratio, and the relative value based on 0 dB of Example 1 was obtained to evaluate electromagnetic conversion characteristics based on the following criteria.

⊚: +1 dB or more
○: −1 dB or more and less than +1 dB
X: less than −1 dB

The magnetic recording tape used for the measurement of electromagnetic conversion characteristics was prepared by the following method.

A back coating composition having the following composition was applied to one side of each of the films obtained in Examples and Comparative Examples (the surface of the film layer B in the case of a laminated film) with a die coater and dried, and a non-magnetic coating composition and a magnetic coating composition having the following compositions were applied to the other side of the film (the surface of the film layer A in the case of a laminated film) with a die coater with changing the film thickness, magnetically aligned and dried. Further, the coating layers were calendered with a small-sized test calender device (steel rolls/nylon rolls, five stages) at a temperature of 70° C. and a linear pressure of 200 kg/cm and cured at 70° C. for 48 hours. The above tape was slit to a width of 12.65 mm and set in a cassette to obtain a magnetic recording tape. The thicknesses of the back coat layer, the non-magnetic layer and the magnetic layer after drying were 0.5 μm, 1.2 μm and 0.1 μm, respectively.

<Composition of Non-magnetic Coating Composition>

| | |
|---|---|
| Titanium dioxide fine particles | 100 pbw |
| Eslec A (vinyl chloride/vinyl acetate copolymer of Sekisui Chemical Co., Ltd.) | 10 pbw |
| Nipporan 2304 (polyurethane elastomer of Nippon Polyurethane Industry Co., Ltd.) | 10 pbw |
| Colonate L (polyisocyanate of Nippon Polyurethane Industry Co., Ltd.) | 5 pbw |
| Lecithin | 1 pbw |
| Methyl ethyl ketone | 75 pbw |
| Methyl isobutyl ketone | 75 pbw |
| Toluene | 75 pbw |
| Carbon black | 2 pbw |
| Lauric acid | 1.5 pbw |

<Composition of Magnetic Coating Composition>

| | |
|---|---|
| Iron (length: 0.3 μm, needle ratio: 10/1, 1800 oersted) | 100 pbw |
| Eslec A (vinyl chloride/vinyl acetate copolymer of Sekisui Chemical Co., Ltd.) | 10 pbw |
| Nipporan 2304 (polyurethane elastomer of Nippon Polyurethane Industry Co., Ltd.) | 10 pbw |
| Colonate L (polyisocyanate of Nippon Polyurethane Industry Co., Ltd.) | 5 pbw |
| Lecithin | 1 pbw |
| Methyl ethyl ketone | 75 pbw |
| Methyl isobutyl ketone | 75 pbw |
| Toluene | 75 pbw |
| Carbon black | 2 pbw |
| Lauric acid | 1.5 pbw |

<Composition of Back Coating Composition>

| | |
|---|---|
| Carbon black | 100 pbw |
| Thermoplastic polyurethane resin | 60 pbw |
| Isocyanate compound (Colonate L of Nippon Polyurethane Industry Co., Ltd.) | 18 pbw |
| Silicone oil | 0.5 pbw |
| Methyl ethyl ketone | 250 pbw |
| Toluene | 50 pbw | pbw: part(s) by weight

(10) Thicknesses of Laminated Film and Each Film Layer 10 laminated films were joined together while air between adjacent layers was removed to measure the thickness of the resulting laminate by using the MDC-25S dial gauge of Mitutoyo Corporation in accordance with the 10 films lamination method specified in JIS C2151 so as to calculate the thickness of each laminated film. This measurement was repeated 10 times to obtain the average value as the thickness of each laminated film.

As for the thicknesses of the film layer A and the film layer B, a film piece was fixed and shaped by an epoxy resin and cut into a super thin piece having a thickness of about 60 nm (cut in parallel with the film forming direction and with the thickness direction of the film) with a microtome. This super thin film sample was observed through a transmission electron microscope (H-800 of Hitachi, Ltd.). When the polymer of the film layer A differed from the polymer of the film layer B and therefore, the boundary between the film layer A and the film layer B could be observed, the thicknesses of the film layers A and B were obtained from the boundary and when the polymers of these film layers A and B were the same and therefore, the boundary could not be observed, 100 positions of thickness where the amount of the inert particles changed were obtained from the each front surface side so as to obtain the thicknesses of the layers A and B from these average values.

(11) Film Productivity

This was evaluated from the recyclability rate of collected chips which could be used in the film layer B based on the following criteria.

◎: 60% or more
○: 40% or more and less than 60%
X: less than 40%

(12) Average Particle Diameter of Particles

A sample film piece was fixed on the sample table of a scanning electron microscope to carry out ion etching on the surface of the film by using the sputtering device (JFC-1100 ion etching device) of JEOL Ltd. under the following conditions. As for the conditions, the sample was set in a bell jar, the vacuum degree was raised to about $10^{-3}$ Torr, and ion etching was carried out at a voltage of 0.25 kV and a current of 12.5 mA for about 10 minutes. Further, gold sputtering was made on the surface of the film with the above apparatus, and the film was observed through the scanning electron microscope at a magnification of 5,000 to 10,000× to obtain the area circle equivalent diameters of 1,000 particles with the Luzex 500 of Nippon Regulator Co., Ltd. The average value of the area circle equivalent diameters of the 1,000 particles was taken as average particle diameter.

When two or more different types of particles were used, a particle size distribution was drawn by plotting the area circle equivalent diameter on the horizontal axis and the frequency on the longitudinal direction, and a peak sandwiched between valleys whose height was smaller than half of the maximum height of the peak was taken as one type of particles to calculate the average particle diameters of these different types of particles.

(13) Content of Particles

A solvent which dissolves the polyester resin but not the particles, was selected to dissolve the polyester resin, and then the particles were separated from the polyester resin by centrifugation to obtain the weight ratio (wt %) of the particles to the total weight as the content of the particles. When a plurality of types of particles were existent, the contents of these different types of particles were calculated from the ratio of each type of particles based on the measurement results of "(6) area circle equivalent diameter (μm) of particle" described above.

(14) Chipping Resistance

This was evaluated by the amount of white powders adhered to a commercially available razor when the side B of the film slit to a width of 12.5 mm was brought into contact with the razor and caused to run at a rate of 60 m/min and ranked as follows.

◎: white powders are rarely produced
○: white powders are slightly produced
X: a large amount of white powders are produced

(15) Coating Nonuniformity by Elongation at the Time of Processing

A film sample having a length of 500 m was prepared by slitting the film to a width of 500 mm, a non-magnetic coating composition and a magnetic coating composition having the above compositions were applied to one side of the sample under a tension of 20 MPa with a die coater at the same time to form a non-magnetic layer having a thickness of 1.2 μm and a magnetic layer having a thickness of 0.1 μm after drying, and then both of the layers were magnetically aligned and dried at 120° C. for 30 seconds. Further, the obtained film was calendered with a small-sized test calender device (steel rolls/nylon rolls, five stages) at a temperature of 70° C. and a linear pressure of 200 kg/cm and cured at 70° C. for 48 hours. The coating nonuniformity of the obtained film having the magnetic layer was evaluated by visual inspection based on the following criteria. Visual inspection was carried out by installing a fluorescent lamp on the rear side of the film and counting the number of light leaks through the magnetic layer. A magnetic recording tape can be produced by forming a back coat layer on this film having the magnetic layer as required, slitting it to a width of 12.65 mm and setting the obtained film in a cassette.

○: less than 2 uncoated parts/250 m$^2$
Δ: 2 or more and less than 10 uncoated parts/250 mm$^2$
X: 10 or more uncoated parts/250 Mm$^2$

(16) Measurement of Viscoelasticity

The film sample was cut to a length of 35 mm in the film forming direction (MD) of the film and to a width of 3 mm in the transverse direction (TD) and heated from room temperature to 200° C. at a rate of 5° C./min under a load of 3 g at a frequency of 1 Hz to measure its viscoelasticity in the MD direction by using a vibron device of Orientec Corp. The peak temperature and peak intensity of tan δ were obtained from the obtained chart.

(17) Curling

The film sample was cut to a length of 250 mm in the film forming direction (MD) of the film and to a width of 100 mm in the transverse direction (TD) and heated at 120° C. under a load of 20 MPa for 1 minute to measure the degree of curling based on the following criteria.

○: no curling
Δ: only four corners of the film sample slightly curl
X: film sample curls like a cylinder Example 1

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-1) for the film layer A which had an intrinsic viscosity of 0.66 dl/g and comprised 73 mol % of 2,6-naphthalenedicarboxylic acid and 27 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester in an amount of 0.1 wt % based on the weight of the resin composition obtained before the polycondensation reaction. This aromatic polyester (A-1) had a melting point of 240° C. and a glass transition temperature of 117° C.

An aromatic polyester (B-1) for the film layer B was obtained in the same manner as described above except that 0.15 wt % of silica particles having an average particle diameter of 0.3 μm and 0.1 wt % of silica particles having an average particle diameter of 0.1 μm were contained. This aromatic polyester (B-1) had a melting point of 240° C. and a glass transition temperature of 117° C.

(Lamination)

The obtained aromatic polyesters (A-1) and (B-1) were supplied into different extruders and laminated together in a die to ensure that the thickness ratio of these layers became 1:2 at 290° C., and the resulting laminate was extruded into a sheet form onto a rotating cooling drum having a temperature of 50° C. while it was molten to obtain an unstretched laminated film. The film was then heated with an IR heater from above between two rollers having different rotating speeds in the film forming direction to ensure that the surface temperature of the film became 135° C. and stretched to 5.6 times in the longitudinal direction (film forming direction) to obtain a monoaxially stretched film. This monoaxially stretched film was guided to a tenter to be stretched to 7.7 times in the transverse direction (crosswise direction) at 140° C. and then heat set at 190° C. for 10 seconds to obtain a biaxially oriented laminated film having a thickness of 5 μm. The characteristic properties of the obtained film are shown in Table 1.

Example 2

Production of Aromatic Polyesters

The same operation as that for the aromatic polyester (A-1) in Example 1 was repeated except that the inert particles to be contained were changed to silica particles having an average particle diameter of 0.15 μm and the content of the particles was changed to 0.2 wt % to produce an aromatic polyester (A-2).

The same operation as that for the aromatic polyester (B-1) in Example 1 was repeated except that the inert particles to be contained were changed to silicone particles having an average particle diameter of 0.5 μm and silica particles having an average particle diameter of 0.15 μm and the contents of these particles were changed to 0.02 wt % and 0.2 wt % to produce an aromatic polyester (B-2).

(Lamination)

A biaxially oriented laminated film was produced by repeating the operation of Example 1 except that the obtained aromatic polyester (A-2) was used to form the film layer A, the aromatic polyester (B-2) was used to form the film layer B, they were supplied into different extruders and laminated together in a die to ensure that their thickness ratio became 1:1 at 290° C., and the resulting laminate was extruded into a sheet form onto a rotating cooling drum having a temperature of 50° C. while it was molten to obtain an unstretched laminated film. The characteristic properties of the obtained film are shown in Table 1.

Example 3

Production of Aromatic Polyesters

An aromatic polyester (A-3) for the film layer A was produced in the same manner as in Example 1 except that the inert particles for the aromatic polyester (A-1) were changed to 0.3 wt % of silica particles having an average particle diameter of 0.05 μm.

An aromatic polyester (B-3) for the film layer B was produced in the same manner as in Example 1 except that the inert particles for the aromatic polyester (B-1) were changed to 0.2 wt % of silica particles having an average particle diameter of 0.2 μm and 0.3 wt % of silica particles having an average particle diameter of 0.05 μm.

(Lamination)

A biaxially oriented laminated film was obtained by repeating the operation of Example 1 except that the obtained aromatic polyesters (A-3) and (B-3) were supplied into different extruders and laminated together in a die to ensure that their thickness ratio became 1:4 at 290° C., and the resulting laminate was extruded into a sheet form onto a rotating cooling drum having a temperature of 50° C. while it was molten to obtain an unstretched laminated film. The characteristic properties of the obtained film are shown in Table 1.

Example 4

Production of Aromatic Polyesters

An aromatic polyester (A-4) for the film layer A was produced in the same manner as in Example 1 except that the inert particles for the aromatic polyester (A-1) were changed to 0.2 wt % of alumina particles having an average particle diameter (primary particle diameter) of 0.06 μm.

An aromatic polyester (B-4) for the film layer B was produced in the same manner as in Example 1 except that the inert particles for the aromatic polyester (B-1) were changed to 0.15 wt % of crosslinked polystyrene particles having an average particle diameter of 0.3 μm and 0.2 wt % of alumina particles having an average particle diameter (primary particle diameter) of 0.06 μm.

(Lamination)

A biaxially oriented laminated film was obtained by repeating the operation of Example 1 except that the obtained aromatic polyesters (A-4) and (B-4) were supplied into different extruders and laminated together in a die to ensure that their thickness ratio became 1:2 at 290° C., and the resulting laminate was extruded into a sheet form onto a rotating cooling drum having a temperature of 50° C. while it was molten to obtain an unstretched laminated film. The characteristic properties of the obtained film are shown in Table 1.

Example 5

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-5) for the film layer A which had an intrinsic viscosity of 0.72 dl/g and comprised 94 mol % of 2,6-naphthalenedicarboxylic acid and 6 mol % of 6,6'-(ethylenedioxy)di-2-naphthoic acid based on the total of all the acid components and 99 mol % of ethylene glycol and 1 mol % of diethylene glycol based on the total of all the glycol components. Silica particles having an average particle diameter of 0.1 μm were contained in the aromatic polyester (A-5) in an amount of 0.1 wt % based on the weight of the resin composition obtained before the polycondensation reaction. This aromatic polyester (A-5) had a melting point of 255° C. and a glass transition temperature of 119° C.

An aromatic polyester (B-5) for the film layer B was obtained in the same manner as the aromatic polyester (A-5) except that the inert particles were changed to 0.15 wt % of silica particles having an average particle diameter of 0.3 and 0.1 wt % of silica particles having an average particle diameter of 0.1 μm. This aromatic polyester (B-5) had a melting point of 255° C. and a glass transition temperature of 119° C.
(Lamination)

An unstretched laminated film was obtained from the obtained aromatic polyesters in the same manner as in Example 1, heated with an IR heater from above between two rollers having different rotating speeds in the film forming direction to ensure that the surface temperature of the film became 140° C. and stretched to 5.3 times in the longitudinal direction (film forming direction) to obtain a monoaxially stretched film. This monoaxially stretched film was guided to a tenter to be stretched to 4.0 times in the transverse direction (crosswise direction) at 140° C. and then heat set at 200° C. for 10 seconds to obtain a biaxially oriented laminated film having a thickness of 5 μm. The characteristic properties of the obtained film are shown in Table 1.

Example 6

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-6) for the film layer A which had an intrinsic viscosity of 0.77 dl/g and comprised 80 mol % of 2,6-naphthalenedicarboxylic acid and 20 mol % of 6,6'-(ethylenedioxy)di-2-naphthoic acid based on the total of all the acid components and 99 mol % of ethylene glycol and 1 mol % of diethylene glycol based on the total of all the glycol components. Silica particles having an average particle diameter of 0.1 μm were contained in the aromatic polyester (A-6) in an amount of 0.1 wt % based on the weight of the resin composition obtained before the polycondensation reaction. This aromatic polyester (A-6) had a melting point of 252° C. and a glass transition temperature of 116° C.

An aromatic polyester (B-6) for the film layer B was obtained in the same manner as the aromatic polyester (A-6) except that the inert particles were changed to 0.15 wt % of silica particles having an average particle diameter of 0.3 μm and 0.1 wt % of silica particles having an average particle diameter of 0.1 μm. This aromatic polyester (B-6) had a melting point of 252° C. and a glass transition temperature of 116° C.
(Lamination)

An unstretched laminated film was obtained from the obtained aromatic polyesters in the same manner as in Example 1, heated with an IR heater from above between two rollers having different rotating speeds in the film forming direction to ensure that the surface temperature of the film became 135° C. and stretched to 5.5 times in the longitudinal direction (film forming direction) to obtain a monoaxially stretched film. This monoaxially stretched film was guided to a tenter to be stretched to 4.3 times in the transverse direction (crosswise direction) at 140° C. and then heat set at 210° C. for 10 seconds, and the thickness of the unstretched film was adjusted to obtain a biaxially oriented laminated film having a thickness of 5 μm. The characteristic properties of the obtained film are shown in Table 1.

Example 7

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-7) for the film layer A which had an intrinsic viscosity of 0.77 dl/g and comprised 65 mol % of 2,6-naphthalenedicarboxylic acid and 35 mol % of 6,6'-(ethylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester (A-7) in an amount of 0.1 wt % based on the weight of the resin composition obtained before the polycondensation reaction. This aromatic polyester (A-7) had a melting point of 247° C. and a glass transition temperature of 116° C.

An aromatic polyester (B-7) for the film layer B was obtained in the same manner as the aromatic polyester (A-7) except that the inert particles were changed to 0.15 wt % of silica particles having an average particle diameter of 0.3 μm and 0.1 wt % of silica particles having an average particle diameter of 0.1 μm. This aromatic polyester (B-7) had a melting point of 247° C. and a glass transition temperature of 116° C.
(Lamination)

The obtained aromatic polyesters were supplied into an extruder to be extruded into a sheet form onto a rotating cooling drum having a temperature of 50° C. from a die at 290° C. while they were molten to obtain an unstretched film. This unstretched film was then heated with an IR heater from above between two rollers having different rotating speeds in the film forming direction to ensure that the surface temperature of the film became 140° C. and stretched to 5.5 times in the longitudinal direction (film forming direction) to obtain a monoaxially stretched film. This monoaxially stretched film was guided to a tenter to be stretched to 6.0 times in the transverse direction (crosswise direction) at 140° C. and heat set at 210° C. for 10 seconds, and the thickness of the unstretched film was adjusted to obtain a biaxially oriented laminated film having a thickness of 5 μm. The characteristic properties of the obtained film are shown in Table 1.

Example 8

Production of Aromatic Polyesters

An esterification reaction and a transesterification reaction among dimethyl terephthalate, 6,6'-(ethylenedioxy)di-2-naphthoic acid and ethylene glycol were carried out in the presence of titanium tetrabutoxide, and then a polycondensation reaction was carried out to obtain an aromatic polyester (A-8) for the film layer A which had an intrinsic viscosity of 0.73 dl/g and comprised 65 mol % of terephthalic acid and 35 mol % of 6,6'-(alkylenedioxy)di-2-naphthoic acid based on the total of all the acid components and 98.5 mol % of ethylene glycol and 1.5 mol % of diethylene glycol based on the total of all the glycol components. Silica particles having an average particle diameter of 0.1 μm were contained in the aromatic polyester (A-8) in an amount of 0.1 wt % based on the weight of the resin composition obtained before the polycondensation reaction. This aromatic polyester (A-8) had a melting point of 233° C. and a glass transition temperature of 91° C.

An aromatic polyester (B-8) for the film layer B was obtained in the same manner as the aromatic polyester (A-8) except that the inert particles were changed to 0.15 wt % of silica particles having an average particle diameter of 0.3 μm and 0.1 wt % of silica particles having an average particle diameter of 0.1 μm. This aromatic polyester (B-8) had a melting point of 233° C. and a glass transition temperature of 91° C.

(Lamination)

An unstretched laminated film was obtained from the obtained aromatic polyesters in the same manner as in Example 1, heated with an IR heater from above between two rollers having different rotating speeds in the film forming direction to ensure that the surface temperature of the film became 110° C. and stretched to 5.0 times in the longitudinal direction (film forming direction) to obtain a monoaxially stretched film. This monoaxially stretched film was guided to a tenter to be stretched to 6.0 times in the transverse direction (crosswise direction) at 120° C. and heat set at 210° C. for 3 seconds, and the thickness of the unstretched film was adjusted to obtain a biaxially oriented laminated film having a thickness of 5 μm. The characteristic properties of the obtained film are shown in Table 1.

Example 9

Production of Aromatic Polyesters

An esterification reaction and a transesterification reaction among dimethyl terephthalate, 6,6'-(ethylenedioxy)di-2-naphthoic acid and ethylene glycol were carried out in the presence of titanium tetrabutoxide, and then a polycondensation reaction was carried out to obtain an aromatic polyester (A-9) for the film layer A which had an intrinsic viscosity of 0.68 dl/g and comprised 80 mol % of terephthalic acid and 20 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester (A-9) in an amount of 0.1 wt % based on the weight of the resin composition obtained before the polycondensation reaction. This aromatic polyester (A-9) had a melting point of 230° C. and a glass transition temperature of 85° C.

An aromatic polyester (B-9) for the film layer B was obtained in the same manner as the aromatic polyester (A-9) except that the inert particles were changed to 0.15 wt % of silica particles having an average particle diameter of 0.3 μm and 0.1 wt % of silica particles having an average particle diameter of 0.1 μm. This aromatic polyester (B-9) had a melting point of 230° C. and a glass transition temperature of 85° C.

(Lamination)

An unstretched laminated film was obtained from the obtained aromatic polyesters in the same manner as in Example 1. The film was then heated with an IR heater from above between two rollers having different rotating speeds in the film forming direction to ensure that the surface temperature of the film became 105° C. and stretched to 5.0 times in the longitudinal direction (film forming direction) to obtain a monoaxially stretched film. This monoaxially stretched film was guided to a tenter to be stretched to 5.2 times in the transverse direction (crosswise direction) at 115° C. and heat set at 210° C. for 3 seconds, and the thickness of the unstretched film was adjusted to obtain a biaxially oriented laminated film having a thickness of 5 μm. The characteristic properties of the obtained film are shown in Table 1.

Example 10

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-10) for the film layer A which had an intrinsic viscosity of 0.70 dl/g and comprised 70 mol % of 2,6-naphthalenedicarboxylic acid and 30 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester (A-10) in an amount of 0.1 wt % based on the weight of the resin composition obtained before the polycondensation reaction. This aromatic polyester (A-10) had a melting point of 268° C. and a glass transition temperature of 101° C.

An aromatic polyester (B-10) for the film layer B was obtained in the same manner as the aromatic polyester (A-10) except that the inert particles were changed to 0.15 wt % of silica particles having an average particle diameter of 0.3 μm and 0.1 wt % of silica particles having an average particle diameter of 0.1 μm. This aromatic polyester (B-10) had a melting point of 268° C. and a glass transition temperature of 101° C.

(Lamination)

The obtained aromatic polyesters were supplied into an extruder to be extruded into a sheet form onto a rotating cooling drum having a temperature of 50° C. from a die at 300° C. while they were molten to obtain an unstretched film. The film was then heated with an IR heater from above between two rollers having different rotating speeds in the film forming direction to ensure that the surface temperature of the film became 135° C. and stretched to 3.0 times in the longitudinal direction (film forming direction) to obtain a monoaxially stretched film. This monoaxially stretched film was guided to a tenter to be stretched to 3.8 times in the transverse direction (crosswise direction) at 140° C. and heat set at 200° C. for 10 seconds, and the thickness of the unstretched film was adjusted to obtain a biaxially oriented laminated film having a thickness of 5 μm. The characteristic properties of the obtained film are shown in Table 1.

Example 11

A biaxially oriented laminated film was obtained in the same manner as in Example 1 except that the thickness ratio (A:B) of the film layer A to the film layer B was changed to 2:1. The characteristic properties of the obtained film are shown in Table 1.

Comparative Example 1

Single-layer Film

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-11) for a single film layer which had an intrinsic viscosity of 0.66 dl/g and comprised 73 mol % of 2,6-naphthalenedicarboxylic acid and 27 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.3 μm were contained in the aromatic polyester (A-11) in an amount of 0.15 wt % based on the weight of the resin composition obtained before the polycondensation reaction. This aromatic polyester (A-11) had a melting point of 240° C. and a glass transition temperature of 117° C.

A biaxially oriented film was obtained by repeating the operation of Example 1 except that the obtained aromatic polyester was extruded into a sheet form onto a rotating cooling drum having a temperature of 50° C. while it was molten to obtain an unstretched (single-layer) film. The characteristic properties of the obtained film are shown in Table 1.

Comparative Example 2

Single-layer Film

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A-12) for a single film layer which had an intrinsic viscosity of 0.66 dl/g and comprised 73 mol % of 2,6-naphthalenedicarboxylic acid and 27 mol % of 6,6'-(alkylenedioxy)di-2-naphthoic acid based on the total of all the acid components acid and 98 mol % of ethylene glycol and 2 mol % of diethylene glycol based on the total of all the glycol components. Silica particles having an average particle diameter of 0.1 μm were contained in the aromatic polyester (A-12) in an amount of 0.1 wt % based on the weight of the resin composition obtained before the polycondensation reaction. This aromatic polyester (A-12) had a melting point of 240° C. and a glass transition temperature of 117° C.

A biaxially oriented film was obtained by repeating the operation of Example 1 except that the obtained aromatic polyester was extruded into a sheet form onto a rotating cooling drum having a temperature of 50° C. while it was molten to obtain an unstretched (single-layer) film. The characteristic properties of the obtained film are shown in Table 1.

Comparative Example 3

Production of Aromatic Polyesters

An esterification reaction and a transesterification reaction among dimethyl 2,6-naphthalene dicarboxylate and ethylene glycol were carried out in the presence of titanium tetrabutoxide, and then a polycondensation reaction was carried out to obtain polyethylene-2,6-naphthalate (A-13) for the film layer A which had an intrinsic viscosity of 0.62 dl/g and comprised 1.5 mol % of diethylene glycol based on the total of all the glycol components. Silica particles having an average particle diameter of 0.1 μm were contained in the polyethylene-2,6-naphthalate (A-13) in an amount of 0.1 wt % based on the weight of the resin composition obtained before the polycondensation reaction.

Polyethylene-2,6-naphthalate (B-11) for the film layer B was obtained in the same manner as the aromatic polyester (A-13) except that the inert particles were changed to 0.15 wt % of silica particles having an average particle diameter of 0.3 μm and 0.1 wt % of silica particles having an average particle diameter of 0.1 μm. These polyethylene-2,6-naphthalates (A-13) and (B-11) had a melting point of 270° C. and a glass transition temperature of 120° C.

(Lamination)

An unstretched laminated film was obtained in the same manner as in Example 1. The film was then heated with an IR heater from above between two rollers having different rotating speeds in the film forming direction to ensure that the surface temperature of the film became 140° C. and stretched to 3.0 times in the longitudinal direction (film forming direction) to obtain a monoaxially stretched film. This monoaxially stretched film was guided to a tenter to be stretched to 4.3 times in the transverse direction (crosswise direction) at 140° C. and heat set at 200° C. for 10 seconds to obtain a biaxially oriented laminated film having a thickness of 5 μm. The characteristic properties of the obtained film are shown in Table 1.

Comparative Example 4

A biaxially oriented laminated film having a thickness of 5 μm was obtained by repeating the operation of Comparative Example 3 except that the stretching temperature in the film forming direction was changed to 140° C., the draw ratio in the film forming direction was changed to 4.0 times, the stretching temperature in the transverse direction was changed to 140° C., the draw ratio in the transverse direction was changed to 4.0 times, the heat setting temperature was changed to 200° C., and the thickness of the unstretched film was changed. The characteristic properties of the obtained film are shown in Table 1.

Comparative Example 5

A biaxially oriented laminated film having a thickness of 5 μm was obtained by repeating the operation of Comparative Example 3 except that the stretching temperature in the film forming direction was changed to 140° C., the draw ratio in the film forming direction was changed to 4.5 times, the stretching temperature in the transverse direction was changed to 140° C., the draw ratio in the transverse direction was changed to 3.4 times, the heat setting temperature was changed to 200° C., and the thickness of the unstretched film was changed. The characteristic properties of the obtained film are shown in Table 1.

TABLE 1

| | Polyester composition | | | | Film thickness | | |
| | Film layer A | | Film layer B | | Thickness ratio | Ratio Layer B/ | |
| | Type of composition | Content of ANA mol % | Type of composition | Content of ANA mol % | Layer B/ Layer A | Total of all layers % | Total layers μm |
|---|---|---|---|---|---|---|---|
| Ex. 1 | A-1 | 27 | B-1 | 27 | 2/1 | 66.7 | 5 |
| Ex. 2 | A-2 | 27 | B-2 | 27 | 1/1 | 50.0 | 5 |
| Ex. 3 | A-3 | 27 | B-3 | 27 | 4/1 | 80.0 | 5 |
| Ex. 4 | A-4 | 27 | B-4 | 27 | 2/1 | 66.7 | 5 |
| Ex. 5 | A-5 | 6 | B-5 | 6 | 2/1 | 66.7 | 5 |
| Ex. 6 | A-6 | 20 | B-6 | 20 | 2/1 | 66.7 | 5 |
| Ex. 7 | A-7 | 35 | B-7 | 35 | 2/1 | 66.7 | 5 |
| Ex. 8 | A-8 | 35 | B-8 | 35 | 2/1 | 66.7 | 5 |
| Ex. 9 | A-9 | 20 | B-9 | 20 | 2/1 | 66.7 | 5 |
| Ex. 10 | A-10 | 70 | B-10 | 70 | 2/1 | 66.7 | 5 |
| Ex. 11 | A-1 | 27 | B-1 | 27 | 1/2 | 33.3 | 5 |
| C. Ex. 1 | A-11 | 27 | — | — | Single layer | — | 5 |
| C. Ex. 2 | A-12 | 27 | — | — | Single layer | — | 5 |
| C. Ex. 3 | A-13 | 0 | B-11 | 0 | 2/1 | 66.7 | 5 |
| C. Ex. 4 | A-13 | 0 | B-11 | 0 | 2/1 | 66.7 | 5 |
| C. Ex. 5 | A-13 | 0 | B-11 | 0 | 2/1 | 66.7 | 5 |
| R. Ex. 1 | — | | | | | | |

| | Physical properties of film | | | | | | | | Characteristics of film | | |
| | Young's modulus (Y) | | Humidity expansion coefficient ($\alpha h$) | | Temperature expansion coefficient ($\alpha t$) | | Surface roughness | | | Electro-magnetic conversion | Film |
| | MD GPa | TD GPa | MD ppm/ % RH | TD ppm/% RH | MD ppm/° C. | TD ppm/° C. | Side B nm | Side A nm | Windability | characteristics | productivity |
|---|---|---|---|---|---|---|---|---|---|---|---|
| Ex. 1 | 6.0 | 8.6 | 5.5 | 4.5 | 7.0 | −3.0 | 8.0 | 3.0 | ◎ | ○ | ◎ |
| Ex. 2 | 6.0 | 8.6 | 5.5 | 4.5 | 7.0 | −3.0 | 6.0 | 5.0 | ◎ | ○ | ○ |
| Ex. 3 | 6.0 | 8.6 | 5.5 | 4.5 | 7.0 | −3.0 | 7.0 | 2.0 | ○ | ◎ | ◎ |
| Ex. 4 | 6.0 | 8.6 | 5.5 | 4.5 | 7.0 | −3.0 | 8.0 | 4.0 | ◎ | ○ | ◎ |
| Ex. 5 | 7.3 | 6.4 | 6.7 | 7.6 | 6.2 | 2.5 | 8.0 | 4.0 | ◎ | ○ | ◎ |
| Ex. 6 | 7.0 | 5.7 | 5.6 | 9.4 | 6.5 | 11.6 | 8.0 | 4.0 | ◎ | ○ | ◎ |
| Ex. 7 | 5.5 | 8.4 | 5.0 | 3.8 | 10.5 | 0.1 | 8.0 | 4.0 | ◎ | ○ | ◎ |
| Ex. 8 | 4.0 | 7.0 | 6.0 | 4.0 | 14 | 3.0 | 8.0 | 4.0 | ◎ | ○ | ◎ |
| Ex. 9 | 4.9 | 5.0 | 7.9 | 7.8 | 10.6 | 13.5 | 8.0 | 4.0 | ◎ | ○ | ◎ |
| Ex. 10 | 4.1 | 6.0 | 7.0 | 6.4 | 16 | 11.9 | 8.0 | 4.0 | ◎ | ○ | ◎ |
| Ex. 11 | 6.0 | 8.6 | 5.5 | 4.5 | 7.0 | −3.0 | 8.0 | 3.0 | ◎ | ◎ | X |
| C. Ex. 1 | 6.0 | 8.6 | 5.5 | 4.5 | 7.0 | −3.0 | 8.0 | 8.2 | ◎ | X | ◎ |
| C. Ex. 2 | 6.0 | 8.6 | 5.5 | 4.5 | 7.0 | −3.0 | 2.0 | 2.0 | X | ◎ | ◎ |
| C. Ex. 3 | 5.5 | 9.5 | 13.5 | 8.6 | 14 | −3.8 | 8.0 | 4.0 | ◎ | ○ | ◎ |
| C. Ex. 4 | 7.1 | 7.3 | 11.5 | 10.5 | 7.1 | 4.5 | 8.0 | 4.0 | ◎ | ○ | ◎ |
| C. Ex. 5 | 9.2 | 5.7 | 8.9 | 13.5 | −2.0 | 13.5 | 8.0 | 4.0 | ◎ | ○ | ◎ |
| R. Ex. 1 | 4.8 | 10.9 | 4.5-6 | | 16.5-19 | | — | — | — | — | — |

Ex.: Example
C. Ex.: Comparative Example
R. Ex. Reference Example

A-1 to A-13 and B-1 to B-11 in Table 1 denote the types of the aromatic polyesters described in Examples, the content of ANA denotes mol % of the 6,6'-(alkylenedioxy)di-2-naphthoic acid based on the total of all the acid components, MD denotes the film forming direction of the film, and TD denotes the transverse direction of the film.

Example 12

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.66 dl/g and comprised 73 mol % of 2,6-naphthalenedicarboxylic acid and 27 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester in an amount of 0.03 wt % based on the weight of the resin composition obtained before the polycondensation reaction. This aromatic polyester (A) had a melting point of 240° C. and a glass transition temperature of 117° C.

An aromatic polyester for the film layer B was obtained in the same manner as the aromatic polyester (A) except that 0.2 wt % of silica particles having an average particle diameter of 0.1 μm were contained. This aromatic polyester (B) had a melting point of 240° C. and a glass transition temperature of 117° C.

(Lamination)

The obtained aromatic polyesters (A) and (B) were supplied into different extruders to be laminated together in a die to ensure that the thickness ratio of these polyesters became 4:1 at 290° C. and extruded into a sheet form onto a rotating cooling drum having a temperature of 50° C. while they were molten to obtain an unstretched laminated film. The film was then heated with an IR heater from above between two rollers having different rotating speeds in the film forming direction to ensure that the surface temperature of the film became 135° C. and stretched to 5.6 times in the longitudinal direction (film forming direction) to obtain a monoaxially stretched film. This monoaxially stretched film was guided to a tenter to be stretched to 8.0 times in the transverse direction (crosswise direction) at 140° C. and then heat set at 190° C. for 10 seconds to obtain a biaxially oriented laminated film having a thickness of 5 μm. The obtained film had a temperature expansion coefficient of 10 ppm/° C. in the MD direction and −2.0 ppm/° C. in the TD direction and a humidity expansion coefficient of 6.5 ppm/% RH in the MD direction and 4.0 ppm/% RH in the TD direction. The other characteristic properties of the obtained film are shown in Table 2.

Example 13

The operation of Example 12 was repeated except that the particles to be contained in the aromatic polyester for the film layer B were changed to 0.1 wt % of silica particles having an average particle diameter of 0.3 μm and 0.1 wt % of silica particles having an average particle diameter of 0.1 μm as small particles and the thickness ratio of the aromatic polyesters (A) and (B) was changed to 3:2. The obtained biaxially oriented laminated film had a temperature expansion coefficient of 10 ppm/° C. in the MD direction and −2.0 ppm/° C. in the TD direction and a humidity expansion coefficient of 6.5 ppm/% RH in the MD direction and 4.0 ppm/% RH in the TD direction. The other characteristic properties of the obtained film are shown in Table 2.

Example 14

The operation of Example 12 was repeated except that the particles to be contained in the aromatic polyester for the film layer B were changed to 0.1 wt % of silica particles having an average particle diameter of 0.3 μm and 0.1 wt % of silica particles having an average particle diameter of 0.1 μm as small particles and the thickness ratio of the aromatic polyesters (A) and (B) was changed to 4:1. The obtained biaxially oriented laminated film had a temperature expansion coefficient of 10 ppm/° C. in the MD direction and −2.0 ppm/° C. in the TD direction and a humidity expansion coefficient of 6.5 ppm/% RH in the MD direction and 4.0 ppm/% RH in the TD direction. The other characteristic properties of the obtained film are shown in Table 2.

Example 15

The operation of Example 12 was repeated except that the particles to be contained in the aromatic polyester for the film layer B were changed to 0.01 wt % of crosslinked silicone particles having an average particle diameter of 0.8 μm and 0.1 wt % of silica particles having an average particle diameter of 0.1 μm as small particles and the thickness ratio of the aromatic polyesters (A) and (B) was changed to 45:5. The obtained biaxially oriented laminated film had a temperature expansion coefficient of 10 ppm/° C. in the MD direction and −2.0 ppm/° C. in the TD direction and a humidity expansion coefficient of 6.5 ppm/% RH in the MD direction and 4.0 ppm/% RH in the TD direction. The other characteristic properties of the obtained film are shown in Table 2.

Example 16

The operation of Example 12 was repeated except that the particles to be contained in the aromatic polyester for the film layer B were changed to 0.02 wt % of crosslinked polystyrene particles having an average particle diameter of 0.6 μm and 0.1 wt % of silica particles having an average particle diameter of 0.1 μm as small particles and the thickness ratio of the aromatic polyesters (A) and (B) was changed to 48:2. The obtained biaxially oriented laminated film had a temperature expansion coefficient of 10 ppm/° C. in the MD direction and −2.0 ppm/° C. in the TD direction and a humidity expansion coefficient of 6.5 ppm/% RH in the MD direction and 4.0 ppm/% RH in the TD direction. The other characteristic properties of the obtained film are shown in Table 2.

Example 17

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.72 dl/g and comprised 94 mol % of 2,6-naphthalenedicarboxylic acid and 6 mol % of 6,6'-(ethylenedioxy)di-2-naphthoic acid based on the total of all the acid components and 99 mol % of ethylene glycol and 1 mol % of diethylene glycol based on the total of all the glycol components. Silica particles having an average particle diameter of 0.1 μm were contained in the aromatic polyester in an amount of 0.03 wt % based on the weight of the resin composition obtained before the polycondensation reaction.

An aromatic polyester (B) for the film layer B was obtained in the same manner as the aromatic polyester (A) except that 0.1 wt % of silica particles having an average particle diameter of 0.3 μm and 0.1 wt % of silica particles having an average particle diameter of 0.1 μm as small particles were contained. The aromatic polyester (A) and the aromatic polyester (B) had a melting point of 255° C. and a glass transition temperature of 119° C.

(Lamination)

An unstretched laminated film was obtained from the obtained aromatic polyesters in the same manner as in Example 14, heated with an IR heater from above between two rollers having different rotating speeds in the film forming direction to ensure that the surface temperature of the film became 140° C. and stretched to 5.3 times in the longitudinal direction (film forming direction) to obtain a monoaxially stretched film. This monoaxially stretched film was guided to a tenter to be stretched to 4.0 times in the transverse direction (crosswise direction) at 140° C. and then heat set at 200° C. for 10 seconds to obtain a biaxially oriented laminated film having a thickness of 5 μm. The obtained film had a temperature expansion coefficient of 4 ppm/° C. in the MD direction and 8 ppm/° C. in the TD direction and a humidity expansion coefficient of 8.5 ppm/% RH in the MD direction and 10.0 ppm/% RH in the TD direction. The other characteristic properties of the obtained film are shown in Table 2.

Example 18

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.77 dl/g and comprised 80 mol % of 2,6-naphthalenedicarboxylic acid and 20 mol % of 6,6'-(ethylenedioxy)di-2-naphthoic acid based on the total of all the acid components and 99 mol % of ethylene glycol and 1 mol % of diethylene glycol based on the total of all the glycol components. Silica particles having an average particle diameter of 0.1 μm were contained in the aromatic polyester in an amount of 0.03 wt % based on the weight of the resin composition obtained before the polycondensation reaction.

An aromatic polyester (B) for the film layer B was obtained in the same manner as the aromatic polyester (A) except that 0.1 wt % of silica particles having an average particle diameter of 0.3 μm and 0.1 wt % of silica particles having an average particle diameter of 0.1 μm as small particles were contained. These aromatic polyesters had a melting point of 252° C. and a glass transition temperature of 116° C.

(Lamination)

An unstretched laminated film was obtained from the obtained aromatic polyesters in the same manner as in Example 14, heated with an IR heater from above between two rollers having different rotating speeds in the film forming direction to ensure that the surface temperature of the film became 135° C. and stretched to 5.5 times in the longitudinal direction (film forming direction) to obtain a monoaxially stretched film. This monoaxially stretched film was guided to a tenter to be stretched to 4.3 times in the transverse direction (crosswise direction) at 140° C. and then heat set at 210° C. for 10 seconds to obtain a biaxially oriented laminated film having a thickness of 5 μm. The obtained film had a temperature expansion coefficient of 6 ppm/° C. in the MD direction and 12 ppm/° C. in the TD direction and a humidity expansion coefficient of 7.0 ppm/% RH in the MD direction and 9.0 ppm/% RH in the TD direction. The other characteristic properties of the obtained film are shown in Table 2.

Example 19

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.77 dl/g and comprised 65 mol % of 2,6-naphthalenedicarboxylic acid and 35 mol % of 6,6'-(ethylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester in an amount of 0.03 wt % based on the weight of the resin composition obtained before the polycondensation reaction.

An aromatic polyester (B) for the film layer B was obtained in the same manner as the aromatic polyester (A) except that 0.1 wt % of silica particles having an average particle diameter of 0.3 μm and 0.1 wt % of silica particles having an average particle diameter of 0.1 μm as small particles were contained. These aromatic polyesters had a melting point of 247° C. and a glass transition temperature of 116° C.

(Lamination)

An unstretched laminated film was obtained from the obtained aromatic polyesters in the same manner as in Example 14, heated with an IR heater from above between two rollers having different rotating speeds in the film forming direction to ensure that the surface temperature of the film became 140° C. and stretched to 5.5 times in the longitudinal direction (film forming direction) to obtain a monoaxially stretched film. This monoaxially stretched film was guided to a tenter to be stretched to 6.0 times in the transverse direction (crosswise direction) at 140° C. and then heat set at 210° C. for 10 seconds to obtain a biaxially oriented laminated film having a thickness of 5 μm. The obtained film had a temperature expansion coefficient of 13 ppm/° C. in the MD direction and 0 ppm/° C. in the TD direction and a humidity expansion coefficient of 7.0 ppm/% RH in the MD direction and 4.0 ppm/% RH in the TD direction. The other characteristic properties of the obtained film are shown in Table 2.

Example 20

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.70 dl/g and comprised 30 mol % of 2,6-naphthalenedicarboxylic acid and 70 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.1 μm were contained in the aromatic polyester in an amount of 0.03 wt % based on the weight of the resin composition obtained before the polycondensation reaction.

An aromatic polyester (B) for the film layer B was obtained in the same manner as the aromatic polyester (A) except that 0.1 wt % of silica particles having an average particle diameter of 0.3 μm and 0.1 wt % of silica particles having an average particle diameter of 0.1 μm as small particles were contained. These aromatic polyesters had a melting point of 268° C. and a glass transition temperature of 101° C.

(Lamination)

An unstretched laminated film was obtained from the obtained aromatic polyesters in the same manner as in Example 14, heated with an IR heater from above between two rollers having different rotating speeds in the film forming direction to ensure that the surface temperature of the film became 135° C. and stretched to 3.0 times in the longitudinal direction (film forming direction) to obtain a monoaxially stretched film. This monoaxially stretched film was guided to a tenter to be stretched to 3.8 times in the transverse direction (crosswise direction) at 140° C. and then heat set at 200° C. for 10 seconds to obtain a biaxially oriented laminated film having a thickness of 5 μm. The obtained film had a temperature expansion coefficient of 16 ppm/° C. in the MD direction and 10 ppm/° C. in the TD direction and a humidity expansion coefficient of 8.0 ppm/% RH in the MD direction and 6.0 ppm/% RH in the TD direction. The other characteristic properties of the obtained film are shown in Table 2.

Example 21

Production of Aromatic Polyesters

An esterification reaction and a transesterification reaction among dimethyl terephthalate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.73 dl/g and comprised 65 mol % of terephthalic acid and 35 mol % of 6,6'-(alkylenedioxy)di-2-naphthoic acid based on the total of all the acid components and 98.5 mol % of ethylene glycol and 1.5 mol % of diethylene glycol based on the total of all the glycol components. Silica particles having an average particle diameter of 0.1 µm were contained in the aromatic polyester in an amount of 0.03 wt % based on the weight of the resin composition obtained before the polycondensation reaction.

An aromatic polyester (B) for the film layer B was obtained in the same manner as the aromatic polyester (A) except that 0.1 wt % of silica particles having an average particle diameter of 0.3 µm and 0.1 wt % of silica particles having an average particle diameter of 0.1 µm as small particles were contained. These aromatic polyesters had a melting point of 233° C. and a glass transition temperature of 91° C.

(Lamination)

An unstretched laminated film was obtained from the obtained aromatic polyesters in the same manner as in Example 14, heated with an IR heater from above between two rollers having different rotating speeds in the film forming direction to ensure that the surface temperature of the film became 110° C. and stretched to 5.0 times in the longitudinal direction (film forming direction) to obtain a monoaxially stretched film. This monoaxially stretched film was guided to a tenter to be stretched to 6.0 times in the transverse direction (crosswise direction) at 120° C. and then heat set at 210° C. for 3 seconds to obtain a biaxially oriented laminated film having a thickness of 5 µm. The obtained film had a temperature expansion coefficient of 20 ppm/° C. in the MD direction and 5.0 ppm/° C. in the TD direction and a humidity expansion coefficient of 8.0 ppm/% RH in the MD direction and 5.0 ppm/% RH in the TD direction. The other characteristic properties of the obtained film are shown in Table 2.

Example 22

Production of Aromatic Polyesters

An esterification reaction and a transesterification reaction among dimethyl terephthalate, 6,6'-(ethylenedioxy)di-2-naphthoic acid and ethylene glycol were carried out in the presence of titanium tetrabutoxide, and then a polycondensation reaction was carried out to obtain an aromatic polyester (A) for the film layer A which had an intrinsic viscosity of 0.68 dl/g and comprised 80 mol % of terephthalic acid and 20 mol % of 6,6'-(alkylenedioxy)di-2-naphthoic acid based on the total of all the acid components and 98 mol % of ethylene glycol and 2 mol % of diethylene glycol based on the total of all the glycol components. Silica particles having an average particle diameter of 0.1 µm were contained in the aromatic polyester in an amount of 0.03 wt % based on the weight of the resin composition obtained before the polycondensation reaction.

An aromatic polyester (B) for the film layer B was obtained in the same manner as the aromatic polyester (A) except that 0.1 wt % of silica particles having an average particle diameter of 0.3 µm and 0.1 wt % of silica particles having an average particle diameter of 0.1 µm as small particles were contained. These aromatic polyesters had a melting point of 230° C. and a glass transition temperature of 85° C.

(Lamination)

An unstretched laminated film was obtained from the obtained aromatic polyesters in the same manner as in Example 14, heated with an IR heater from above between two rollers having different rotating speeds in the film forming direction to ensure that the surface temperature of the film became 105° C. and stretched to 5.0 times in the longitudinal direction (film forming direction) to obtain a monoaxially stretched film. This monoaxially stretched film was guided to a tenter to be stretched to 5.2 times in the transverse direction (crosswise direction) at 115° C. and then heat set at 210° C. for 3 seconds to obtain a biaxially oriented laminated film having a thickness of 5 µm. The obtained film had a temperature expansion coefficient of 15 ppm/° C. in the MD direction and 15 ppm/° C. in the TD direction and a humidity expansion coefficient of 9.5 ppm/% RH in the MD direction and 9.5 ppm/% RH in the TD direction. The other characteristic properties of the obtained film are shown in Table 2.

Comparative Example 6

The operation of Example 12 was repeated except that the particles to be contained in the aromatic polyester for the film layer B were changed to 0.01 wt % of crosslinked silicone particles having an average particle diameter of 0.8 µm and 0.1 wt % of silica particles having an average particle diameter of 0.1 µm as small particles and the thickness ratio of the aromatic polyesters (A) and (B) was changed to 49:1. The characteristic properties of the obtained biaxially oriented laminated film are shown in Table 2.

Comparative Example 7

The operation of Example 12 was repeated except that the particles to be contained in the aromatic polyester for the film layer B were changed to 0.2 wt % of silica particles having an average particle diameter of 0.05 µm and the thickness ratio of the aromatic polyesters (A) and (B) was changed to 43:7. The characteristic properties of the obtained biaxially oriented laminated film are shown in Table 2.

Comparative Example 8

Production of Aromatic Polyesters

An esterification reaction and a transesterification reaction between dimethyl 2,6-naphthalene dicarboxylate and ethylene glycol were carried out in the presence of titanium tetrabutoxide, and then a polycondensation reaction was carried out to obtain an aromatic polyester (polyethylene-2,6-naphthalate) (A) for the film layer A which had an intrinsic viscosity of 0.62 dl/g and comprised 1.5 mol % of diethylene glycol based on the total of all the glycol components. Silica particles having an average particle diameter of 0.1 µm were contained in the aromatic polyester in an amount of 0.03 wt % based on the weight of the resin composition obtained before the polycondensation reaction.

An aromatic polyester (polyethylene-2,6-naphthalate) (B) for the film layer B was obtained in the same manner as the aromatic polyester (A) except that 0.03 wt % of crosslinked silicone particles having an average particle diameter of 0.5 µm and 0.1 wt % of silica particles having an average particle diameter of 0.1 µm as small particles were contained. These aromatic polyesters (A) and (B) had a melting point of 270° C. and a glass transition temperature of 120° C.
(Lamination)

The obtained aromatic polyesters (A) and (B) were supplied into different extruders to be laminated together in a die to ensure that the thickness ratio of these polyesters became 4:1 at 290° C. and extruded into a sheet form onto a rotating cooling drum having a temperature of 50° C. while they were molten to obtain an unstretched laminated film. This film was then heated with an IR heater from above between two rollers having different rotating speeds in the film forming direction to ensure that the surface temperature of the film became 140° C. and stretched to 4.0 times in the longitudinal direction (film forming direction) to obtain a monoaxially stretched film. This monoaxially stretched film was guided to a tenter to be stretched to 5.4 times in the transverse direction (crosswise direction) at 145° C. and then heat set at 200° C. for 10 seconds to obtain a biaxially oriented laminated film having a thickness of 5 µm. The characteristic properties of the obtained film are shown in Table 2.

TABLE 2

| | Acid components | | Film layer B | | | | | | |
|---|---|---|---|---|---|---|---|---|---|
| | | | Particles 1 | | | Particles 2 | | | |
| | ANA mol % | Another component Type | Type | Average particle diameter µm | Content wt % | Particle diameter/ Thickness | Type | Average particle diameter µm | Content wt % | Particle diameter/ Thickness |
| Ex. 12 | 27 | NA | Silica | 0.1 | 0.20 | 10.0 | — | — | — | — |
| Ex. 13 | 27 | NA | Silica | 0.3 | 0.10 | 6.67 | Silica | 0.1 | 0.1 | 20 |
| Ex. 14 | 27 | NA | Silica | 0.3 | 0.10 | 3.33 | Silica | 0.1 | 0.1 | 10 |
| Ex. 15 | 27 | NA | Crosslinked silicone | 0.8 | 0.01 | 0.63 | Silica | 0.1 | 0.1 | 5 |
| Ex. 16 | 27 | NA | Closslinked polystyrene | 0.6 | 0.02 | 0.33 | Silica | 0.1 | 0.1 | 2 |
| Ex. 17 | 6 | NA | Silica | 0.3 | 0.10 | 3.33 | Silica | 0.1 | 0.1 | 10 |
| Ex. 18 | 20 | NA | Silica | 0.3 | 0.10 | 3.33 | Silica | 0.1 | 0.1 | 10 |
| Ex. 19 | 35 | NA | Silica | 0.3 | 0.10 | 3.33 | Silica | 0.1 | 0.1 | 10 |
| Ex. 20 | 70 | NA | Silica | 0.3 | 0.10 | 3.33 | Silica | 0.1 | 0.1 | 10 |
| Ex. 21 | 35 | TA | Silica | 0.3 | 0.10 | 3.33 | Silica | 0.1 | 0.1 | 10 |
| Ex. 22 | 20 | TA | Silica | 0.3 | 0.10 | 3.33 | Silica | 0.1 | 0.1 | 10 |
| C. Ex. 6 | 27 | NA | Crosslinked silicone | 0.8 | 0.01 | 0.13 | Silica | 0.1 | 0.1 | 1 |
| C. Ex. 7 | 27 | NA | Silica | 0.05 | 0.20 | 14.0 | — | — | — | — |
| C. Ex. 8 | — | NA | Crosslinked silicone | 0.5 | 0.03 | 2.00 | Silica | 0.1 | 0.1 | 10 |

| | Film layer A | | | | |
|---|---|---|---|---|---|
| | Acid components | | Particles of film layer A | | |
| | ENA mol % | Another component Type | Type | Average µm | Content wt % |
| Ex. 12 | 27 | NA | Silica | 0.1 | 0.03 |
| Ex. 13 | 27 | NA | Silica | 0.1 | 0.03 |
| Ex. 14 | 27 | NA | Silica | 0.1 | 0.03 |
| Ex. 15 | 27 | NA | Silica | 0.1 | 0.03 |
| Ex. 16 | 27 | NA | Silica | 0.1 | 0.03 |
| Ex. 17 | 6 | NA | Silica | 0.1 | 0.03 |
| Ex. 18 | 20 | NA | Silica | 0.1 | 0.03 |
| Ex. 19 | 35 | NA | Silica | 0.1 | 0.03 |
| Ex. 20 | 70 | NA | Silica | 0.1 | 0.03 |
| Ex. 21 | 35 | TA | Silica | 0.1 | 0.03 |
| Ex. 22 | 20 | TA | Silica | 0.1 | 0.03 |
| C. Ex. 6 | 27 | NA | Silica | 0.1 | 0.03 |
| C. Ex. 7 | 27 | NA | Silica | 0.1 | 0.03 |
| C. Ex. 8 | — | NA | Silica | 0.1 | 0.03 |

TABLE 2-continued

| | Biaxially oriented laminated film | | | | | | | | |
|---|---|---|---|---|---|---|---|---|---|
| | Film thickness | | | Young's modulus | | Surface roughness Ra | | Chipping resistance | |
| | Layer B | Layer A | All layers | MD | TD | Side B | Side A | Side B | Windability |
| | $(t_B)$ μm | $(t_A)$ μm | $(t)$ μm | GPa | GPa | nm | nm | — | — |
| Ex. 12 | 1.0 | 4.0 | 5.0 | 6.0 | 9.0 | 5 | 2 | ◎ | ○ |
| Ex. 13 | 2.0 | 3.0 | 5.0 | 6.0 | 9.0 | 7 | 3 | ◎ | ◎ |
| Ex. 14 | 1.0 | 4.0 | 5.0 | 6.0 | 9.0 | 7 | 2 | ◎ | ◎ |
| Ex. 15 | 0.5 | 4.5 | 5.0 | 6.0 | 9.0 | 6 | 2 | ○ | ◎ |
| Ex. 16 | 0.2 | 4.8 | 5.0 | 6.0 | 9.0 | 6 | 2 | ○ | ◎ |
| Ex. 17 | 1.0 | 4.0 | 5.0 | 7.3 | 6.4 | 7 | 2 | ○ | ◎ |
| Ex. 18 | 1.0 | 4.0 | 5.0 | 7.0 | 5.7 | 7 | 2 | ◎ | ◎ |
| Ex. 19 | 1.0 | 4.0 | 5.0 | 5.5 | 8.4 | 7 | 2 | ◎ | ◎ |
| Ex. 20 | 1.0 | 4.0 | 5.0 | 4.9 | 6.0 | 7 | 2 | ◎ | ◎ |
| Ex. 21 | 1.0 | 4.0 | 5.0 | 4.0 | 7.0 | 7 | 2 | ◎ | ◎ |
| Ex. 22 | 1.0 | 4.0 | 5.0 | 4.9 | 5.0 | 7 | 2 | ◎ | ◎ |
| C. Ex. 6 | 0.1 | 4.9 | 5.0 | 6.0 | 9.0 | 6 | 2 | X | ◎ |
| C. Ex. 7 | 0.7 | 4.3 | 5.0 | 6.0 | 9.0 | 4 | 1.5 | ◎ | X |
| C. Ex. 8 | 1.0 | 4.0 | 5.0 | 6.0 | 9.0 | 6 | 2 | X | ◎ |

Ex.: Example
C. Ex.: Comparative Example

Example 23

Production of Aromatic Polyesters

An esterification reaction and a transesterification reaction among dimethyl 2,6-naphthalene dicarboxylate and ethylene glycol were carried out in the presence of titanium tetrabutoxide, and then a polycondensation reaction was carried out to obtain polyethylene-2,6-naphthalate (A-1) for the film layer A which comprised 1.5 mol % of diethylene glycol based on the total of all the glycol components. Silica particles having an average particle diameter of 0.15 μm were contained in the polyethylene-2,6-naphthalate (3A-1) in an amount of 0.1 wt % based on the weight of the resin composition obtained before the polycondensation reaction.

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (3B-1) for the film layer B which comprised 73 mol % of 2,6-naphthalenedicarboxylic acid and 27 mol % of 6,6'-(alkylenedioxy)di-2-naphthoic acid based on the total of all the acid components and 98 mol % of ethylene glycol and 2 mol % of diethylene glycol based on the total of all the glycol components. 0.15 wt % of silica particles having an average particle diameter of 0.3 μm and 0.10 wt % of silica particles having an average particle diameter of 0.15 μm were contained in the aromatic polyester based on the weight of the resin composition obtained before the polycondensation reaction. This aromatic polyester (3B-1) had a melting point of 240° C. and a glass transition temperature of 117° C.
(Lamination)

The obtained aromatic polyesters (3A-1) and (3B-1) were supplied into different extruders to be laminated together in a die to ensure that the thickness ratio of these aromatic polyesters became 1:2 at 295° C. and extruded into a sheet form onto a rotating cooling drum having a temperature of 50° C. while they were molten to obtain an unstretched laminated film. This film was heated with an IR heater from above between two rollers having different rotating speeds in the film forming direction to ensure that the surface temperature of the film became 135° C. and stretched to 5.3 times in the longitudinal direction (film forming direction) to obtain a monoaxially stretched film. This monoaxially stretched film was guided to a tenter to be stretched to 6.0 times in the transverse direction (crosswise direction) at 145° C. and then heat set at 190° C. for 5 seconds to obtain a biaxially oriented laminated film having a thickness of 5 μm. The characteristic properties of the obtained film are shown in Table 3.

Example 24

The operation of Example 23 was repeated except that the inert particles to be contained were changed as shown in Table 3 and the thickness ratio of the layer B to the layer A was changed to 1:1 to obtain a biaxially oriented laminated film. The characteristic properties of the obtained film are shown in Table 3.

Example 25

The operation of Example 23 was repeated except that the inert particles to be contained were changed as shown in Table 3 and the thickness ratio of the layer B to the layer A was changed to 4:1 to obtain a biaxially oriented laminated film. The characteristic properties of the obtained film are shown in Table 3.

Example 26

The operation of Example 23 was repeated except that the inert particles to be contained were changed as shown in Table 3 to obtain a biaxially oriented laminated film. The characteristic properties of the obtained film are shown in Table 3.

Example 27

The operation of Example 23 was repeated except that the draw ratio in the longitudinal direction was changed to 5.5 times and the draw ratio in the transverse direction was changed to 5.3 times to obtain a biaxially oriented laminated film. The characteristic properties of the obtained film are shown in Table 3.

Example 28

The operation of Example 23 was repeated except that the draw ratio in the longitudinal direction was changed to 5.0 times and the draw ratio in the transverse direction was changed to 7.5 times to obtain a biaxially oriented laminated film. The characteristic properties of the obtained film are shown in Table 3.

Example 29

The operation of Example 23 was repeated except that the aromatic polyester for the film layer B comprised 65 mol % of 2,6-naphthalenedicarboxylic acid and 35 mol % of 6,6'-(alkylenedioxy)di-2-naphthoic acid based on the total of all the acid components to obtain a biaxially oriented laminated film. The characteristic properties of the obtained film are shown in Table 3.

Example 30

The operation of Example 23 was repeated except that the aromatic polyester for the film layer B comprised 72 mol % of 2,6-naphthalenedicarboxylic acid and 18 mol % of 6,6'-(alkylenedioxy)di-2-naphthoic acid based on the total of all the acid components to obtain a biaxially oriented laminated film. The characteristic properties of the obtained film are shown in Table 3.

Comparative Example 9

The operation of Example 23 was repeated except that the biaxially oriented laminated film was changed to a single-layer film consisting of the film layer B to obtain a biaxially oriented film. The characteristic properties of the obtained film are shown in Table 3.

Comparative Example 10

Production of Aromatic Polyester

An esterification reaction and a transesterification reaction between dimethyl 2,6-naphthalene dicarboxylate and ethylene glycol were carried out in the presence of titanium tetrabutoxide, and then a polycondensation reaction was carried out to obtain polyethylene-2,6-naphthalate(3B-11) for the film layer B which had an intrinsic viscosity of 0.62 dl/g and comprised 1.5 mol % of diethylene glycol based on the total of all the glycol components. 0.15 wt % of silica particles having an average particle diameter of 0.30 µm and 0.10 wt % of silica particles having an average particle diameter of 0.15 µm were contained in the polyethylene-2,6-naphthalate (3B-11) based on the weight of the resin composition obtained before the polycondensation reaction.

(Lamination)

The operation of Example 23 was repeated except that the aromatic polyester for the film layer B was changed to the polyester (3B-11), the draw ratio in the longitudinal direction was changed to 5.0 times, the draw ratio in the transverse direction was changed to 6.4 times, and the stretching temperature in the transverse direction was changed to 150° C. to obtain a biaxially oriented laminated film. The characteristic properties of the obtained film are shown in Table 3.

Example 31

The operation of Example 23 was repeated except that the thickness ratio of the layer B to the layer A was changed to 1:2 to obtain a biaxially oriented laminated film. The characteristic properties of the obtained film are shown in Table 3.

Comparative Example 11

The operation of Example 23 was repeated except that the aromatic polyester for the film layer A was changed to an aromatic polyester which comprised 94 mol % of 2,6-naphthalenedicarboxylic acid and 6 mol % of 6,6'-(alkylenedioxy)di-2-naphthoic acid based on the total of all the acid components to obtain a biaxially oriented laminated film. The characteristic properties of the obtained film are shown in Table 3.

Example 32

The operation of Example 23 was repeated except that the inert particles to be contained were changed as shown in Table 3, the laminated structure was changed to a three-layer structure consisting of the layer A, layer B and layer A, and the thickness ratio of these layers was changed to 1/4/1 as shown in Table 2 to obtain a biaxially oriented laminated film. The characteristic properties of the obtained film are shown in Table 3.

Example 33

The operation of Example 23 was repeated except that the aromatic polyester for the film layer A was changed to an aromatic polyester which comprised 98 mol % of 2,6-naphthalenedicarboxylic acid and 2 mol % of 6,6'-(alkylenedioxy)di-2-naphthoic acid based on the total of all the acid components to obtain a biaxially oriented laminated film. The characteristic properties of the obtained film are shown in Table 3.

TABLE 3

| | | Film layer B | | | | | | | |
|---|---|---|---|---|---|---|---|---|---|
| | | Particles ① | | | Particles ② | | | | |
| | Type | Average particle diameter µm | Content wt % | Type | Average particle diameter µm | Content wt % | ANA content mol % | Tg ° C. | Tm ° C. |
| Ex. 23 | Silica | 0.30 | 0.15 | Silica | 0.15 | 0.10 | 27 | 117 | 238 |
| Ex. 24 | Silicone | 0.50 | 0.02 | Silica | 0.10 | 0.15 | 27 | 117 | 238 |
| Ex. 25 | Silica | 0.15 | 0.15 | Silica | 0.05 | 0.30 | 27 | 117 | 238 |
| Ex. 26 | Pst | 0.30 | 0.07 | Alumina | 0.06 | 0.20 | 27 | 117 | 238 |
| Ex. 27 | Silica | 0.30 | 0.15 | Silica | 0.15 | 0.10 | 27 | 117 | 238 |
| Ex. 28 | Silica | 0.30 | 0.15 | Silica | 0.15 | 0.10 | 27 | 117 | 238 |

TABLE 3-continued

| | | | | | | | | | |
|---|---|---|---|---|---|---|---|---|---|
| Ex. 29 | Silica | 0.30 | 0.15 | Silica | 0.15 | 0.10 | 35 | 116 | 243 |
| Ex. 30 | Silica | 0.30 | 0.15 | Silica | 0.15 | 0.10 | 18 | 117 | 255 |
| C. Ex. 9 | Silica | 0.30 | 0.15 | Silica | 0.15 | 0.10 | 27 | 117 | 238 |
| C. Ex. 10 | Silica | 0.30 | 0.15 | Silica | 0.15 | 0.10 | 0 | 120 | 270 |
| Ex. 31 | Silica | 0.30 | 0.15 | Silica | 0.15 | 0.10 | 27 | 117 | 238 |
| C. Ex. 11 | Silica | 0.30 | 0.15 | Silica | 0.15 | 0.10 | 27 | 117 | 238 |
| Ex. 32 | Silica | 0.30 | 0.15 | | | | 27 | 117 | 238 |
| Ex. 33 | Silica | 0.30 | 0.15 | Silica | 0.15 | 0.10 | 27 | 117 | 238 |

| | Film layer A | | | | | |
|---|---|---|---|---|---|---|
| | | Particle | | | | |
| | Type | Average particle diameter μm | Content wt % | ANA content mol % | Tg °C. | Tm °C. |
| Ex. 23 | Silica | 0.15 | 0.10 | 0 | 120 | 270 |
| Ex. 24 | Silica | 0.10 | 0.15 | 0 | 120 | 270 |
| Ex. 25 | Silica | 0.05 | 0.30 | 0 | 120 | 270 |
| Ex. 26 | Alumina | 0.06 | 0.20 | 0 | 120 | 270 |
| Ex. 27 | Silica | 0.15 | 0.10 | 0 | 120 | 270 |
| Ex. 28 | Silica | 0.15 | 0.10 | 0 | 120 | 270 |
| Ex. 29 | Silica | 0.15 | 0.10 | 0 | 120 | 270 |
| Ex. 30 | Silica | 0.15 | 0.10 | 0 | 120 | 270 |
| C. Ex. 9 | | | (single layer) | | | |
| C. Ex. 10 | Silica | 0.15 | 0.10 | 0 | 120 | 270 |
| Ex. 31 | Silica | 0.15 | 0.10 | 0 | 120 | 270 |
| C. Ex. 11 | Silica | 0.15 | 0.10 | 6 | 119 | 255 |
| Ex. 32 | Silica | 0.3 | 0.15 | 0 | 120 | 270 |
| Ex. 33 | Silica | 0.15 | 0.10 | 2 | 120 | 265 |

| | Film thickness | | | Characteristic properties of film | | | | | | | | | |
|---|---|---|---|---|---|---|---|---|---|---|---|---|---|
| | Thickness ratio of layer B to layer A | Thickness ratio of layer B to the total of all the layers % | All layers | Young's modulus GPa | | Humidity expansion coefficient (αh) ppm/% RH | | Temperature expansion coefficient (αt) ppm/° C. | | Surface roughness nm | | Tanδ peak temperature °C. | Coating non-niformity |
| | | | | MD | TD | MD | TD | MD | TD | Side B | Side A | | |
| Ex. 23 | 2/1 | 67 | 5.0 | 5.5 | 7.1 | 8.2 | 6.1 | 12.9 | 4.8 | 8.0 | 3.0 | 147 | ◯ |
| Ex. 24 | 1/1 | 50 | 5.0 | 5.5 | 7.1 | 9.3 | 7.1 | 13.8 | 5.0 | 7.6 | 2.6 | 147 | ◯ |
| Ex. 25 | 4/1 | 80 | 5.0 | 5.5 | 7.2 | 6.5 | 5.1 | 11.0 | 4.2 | 8.7 | 3.5 | 147 | Δ |
| Ex. 26 | 2/1 | 67 | 5.0 | 5.5 | 7.1 | 8.2 | 6.1 | 12.9 | 4.8 | 7.3 | 2.9 | 147 | ◯ |
| Ex. 27 | 2/1 | 67 | 5.0 | 7.6 | 6.1 | 5.6 | 7.3 | 2.0 | 10.5 | 7.9 | 3.2 | 150 | ◯ |
| Ex. 28 | 2/1 | 67 | 5.0 | 5.3 | 8.6 | 8.5 | 4.6 | 14.1 | −3.7 | 8.1 | 3.1 | 146 | ◯ |
| Ex. 29 | 2/1 | 67 | 5.0 | 5.5 | 7.1 | 6.0 | 4.9 | 8.1 | 4.7 | 8.6 | 3.2 | 147 | ◯ |
| Ex. 30 | 2/1 | 67 | 5.0 | 5.5 | 7.1 | 9.5 | 7.5 | 14.0 | 5.1 | 7.5 | 2.8 | 147 | ◯ |
| C. Ex. 9 | — | — | 5.0 | 5.8 | 8.5 | 5.6 | 4.4 | 7.5 | −2.6 | 8.2 | 8.1 | 125 | X |
| C. Ex. 10 | 2/1 | 67 | 5.0 | 5.5 | 9.5 | 13.5 | 8.6 | 14.0 | −3.8 | 7.3 | 2.3 | 155 | ◯ |
| Ex. 31 | 1/2 | 33 | 5.0 | 5.5 | 7.1 | 12.0 | 7.3 | 13.0 | 5.0 | 6.3 | 2.0 | 147 | ◯ |
| C. Ex. 11 | 2/1 | 67 | 5.0 | 5.5 | 7.1 | 6.1 | 4.7 | 12.3 | 4.8 | 8.0 | 3.1 | 130 | X |
| Ex. 32 | A/B/A = 1/4/1 | 67 | 5.0 | 5.5 | 7.1 | 8.2 | 6.1 | 12.9 | 4.8 | 6.3 | 6.2 | 147 | ◯ |
| Ex. 33 | 2/1 | 67 | 5.0 | 5.5 | 7.1 | 8.0 | 5.9 | 12.9 | 4.9 | 8.0 | 3.1 | 144 | ◯ |

Ex.: Example
C. Ex.: Comparative Example

In Table 3, Pst denotes crosslinked polystyrene particles, and the content of ANA denotes the amount of the 6,6'-(alkylenedioxy)di-2-naphthoic acid based on the total number of moles of all the acid components. As for the surface roughness of Example 10, the side in contact with the cooling drum was designated as the side B and the opposite side was designated as the side A.

Example 34

Production of Aromatic Polyesters

An esterification reaction and a transesterification reaction between dimethyl 2,6-naphthalene dicarboxylate and ethylene glycol were carried out in the presence of titanium tetrabutoxide, and then a polycondensation reaction was carried out to obtain polyethylene-2,6-naphthalate (4A-1) for the film layer A which comprised 1.5 mol % of diethylene glycol based on total of all the glycol components. 0.3 wt % of silica particles having an average particle diameter of 0.3 μm and 0.2 wt % of silica particles having an average particle diameter of 0.15 μm were contained in the polyethylene-2,6-naphthalate (4A-1) based on the weight of the resin composition obtained before the polycondensation reaction.

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (4B-1) for the film layer B which comprised 73 mol % of 2,6-naphthalenedicarboxylic acid and 27 mol % of 6,6'-(alkylenedioxy)di-2-naphthoic based on the total of all the acid components acid and 98 mol % of ethylene glycol and 2 mol % of diethylene glycol based on the total of all the glycol components. This aromatic polyester (4B-1) had a melting point of 240° C. and a glass transition temperature of 117° C.

(Lamination)

The obtained aromatic polyesters (4A-1) and (4B-1) were dried at 170° C. for 6 hours, supplied into different extruders and heated up to 295° C. to be molten, 101 layers were formed from the polyester for layers (4A-1), 100 layers were formed from the polyester for layers (4B-1), a multi-layer feed block device was used to laminate together the layers (4A-1) and the layers (4B-1) alternately and guide the resulting laminate into a die while keeping its laminated state, and the laminate was extruded into a sheet form onto a rotating cooling drum having a temperature of 50° C. while it was molten to obtain an unstretched multi-layer laminated film composed of 201 alternating layers consisting of the layers (4A-1) and the layers (4B-1). The delivery ratio of the layer B to the layer A was 2:1. This laminated film was then heated with an IR heater from above between two rollers having different rotating speeds in the film forming direction to ensure that the surface temperature of the film became 135° C. and stretched to 5.3 times in the longitudinal direction (film forming direction) to obtain a monoaxially stretched film. This monoaxially stretched film was guided to a tenter to be stretched to 6.0 times in the transverse direction (crosswise direction) at 145° C. and then heat set at 190° C. for 5 seconds to obtain a biaxially oriented multi-layer laminated film having a thickness of 5 μm. The characteristic properties of the obtained film are shown in Table 4.

Example 35

The operation of Example 34 was repeated except that the delivery ratio of the layer B to the layer A was changed to 1:1 to obtain a biaxially oriented multi-layer laminated film. The characteristic properties of the obtained film are shown in Table 4.

Example 36

The operation of Example 34 was repeated except that the delivery ratio of the layer B to the layer A was changed to 4:1 to obtain a biaxially oriented multi-layer laminated film. The characteristic properties of the obtained film are shown in Table 4.

Example 37

The operation of Example 34 was repeated except that the total number of layers was changed to 101 consisting of 51 layers A and 50 layers B to obtain a biaxially oriented multi-layer laminated film. The characteristic properties of the obtained film are shown in Table 4.

Example 38

The operation of Example 34 was repeated except that the draw ratio in the longitudinal direction was changed to 5.5 times and the draw ratio in the transverse direction was changed to 5.3 times to obtain a biaxially oriented multi-layer laminated film. The characteristic properties of the obtained film are shown in Table 4.

Example 39

The operation of Example 34 was repeated except that the draw ratio in the longitudinal direction was changed to 5.0 times and the draw ratio in the transverse direction was changed to 7.5 times to obtain a biaxially oriented multi-layer laminated film. The characteristic properties of the obtained film are shown in Table 4.

Example 40

The operation of Example 34 was repeated except that the aromatic polyester for the film layer B comprised 65 mol % of 2,6-naphthalenedicarboxylic acid and 35 mol % of 6,6'-(alkylenedioxy)di-2-naphthoic acid based on the total of all the acid components to obtain a biaxially oriented multi-layer laminated film. The characteristic properties of the obtained film are shown in Table 4.

Example 41

The operation of Example 34 was repeated except that the aromatic polyester for the film layer B comprised 72 mol % of 2,6-naphthalenedicarboxylic acid and 18 mol % of 6,6'-(alkylenedioxy)di-2-naphthoic acid based on the total of all the acid components to obtain a biaxially oriented multi-layer laminated film. The characteristic properties of the obtained film are shown in Table 4.

Example 42

The operation of Example 34 was repeated except that the aromatic polyester for the film layer A comprised 98 mol % of 2,6-naphthalenedicarboxylic acid and 2 mol % of 6,6'-(alkylenedioxy)di-2-naphthoic acid based on the total of all the acid components to obtain a biaxially oriented multi-layer laminated film. The characteristic properties of the obtained film are shown in Table 4.

Comparative Example 12

Production of Aromatic Polyesters

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide, and then a polycondensation reaction was carried out to obtain an aromatic polyester (4A-9) for the film layer A which comprised 73 mol % of 2,6-naphthalenedicarboxylic acid and 27 mol % of 6,6'-(alkylenedioxy)di-2-naphthoic acid based on the total of all the acid components and 98 mol % of ethylene glycol and 2 mol % of diethylene glycol based on the total of all the glycol components. 0.3 wt % of silica particles having an average particle diameter of 0.3 μm and 0.2 wt % of silica particles having an average particle diameter of 0.15 μm were contained in the aromatic polyester based on the weight of the resin composition obtained before the polycondensation reaction.

(Lamination)

The operation of Example 34 was repeated except that the aromatic polyester for the film layer A was changed to the polyester (4A-9), the draw ratio in the longitudinal direction was changed to 5.8 times, the draw ratio in the transverse direction was changed to 7.7 times, and the stretching temperature in the transverse direction was changed to 140° C. to obtain a biaxially oriented multi-layer laminated film. The characteristic properties of the obtained film are shown in Table 4.

Comparative Example 13

The operation of Example 34 was repeated except that the biaxially oriented multi-layer laminated film was changed to a single-layer film consisting of the film layer B to obtain a biaxially oriented film. The characteristic properties of the obtained film are shown in Table 4.

Comparative Example 14

An esterification reaction and a transesterification reaction between dimethyl 2,6-naphthalene dicarboxylate and ethylene glycol were carried out in the presence of titanium tetrabutoxide, and then a polycondensation reaction was carried out to obtain polyethylene-2,6-naphthalate (4B-11) for the film layer A which had an intrinsic viscosity of 0.62 dl/g and comprised 1.5 mol % of diethylene glycol based on the total of all the glycol components. The operation of Example 34 was repeated except that the aromatic polyester for the film layer B was changed to the polyester (4B-11), the draw ratio in the longitudinal direction was changed to 5.0 times, the draw ratio in the transverse direction was changed to 6.4 times, and the stretching temperature in the transverse direction was changed to 150° C. to obtain a biaxially oriented multi-layer laminated film. The characteristic properties of the obtained film are shown in Table 4.

Comparative Example 15

The operation of Example 34 was repeated except that the unstretched multi-layer laminated film was changed to a double-layer laminated film consisting of one layer B and one layer A to obtain a biaxially oriented laminated film. The characteristic properties of the obtained film are shown in Table 4.

TABLE 4

| | Film layer B | | | | Film layer A | | | | Thickness ratio of layer B to layer A —/— | Thickness ratio of layer B to the total of all layers % | Number of all layers layer | Film thickness Total thickness μm |
|---|---|---|---|---|---|---|---|---|---|---|---|---|
| | Content of ANA mol % | Number of layers layer | Tg °C. | Tm °C. | Content of ANA mol % | Number of layers layer | Tg °C. | Tm °C. | | | | |
| Ex. 34 | 27 | 100 | 117 | 238 | 0 | 101 | 120 | 270 | 2/1 | 67 | 201 | 5.0 |
| Ex. 35 | 27 | 100 | 117 | 238 | 0 | 101 | 120 | 270 | 1/1 | 50 | 201 | 5.0 |
| Ex. 36 | 27 | 100 | 117 | 238 | 0 | 101 | 120 | 270 | 4/1 | 80 | 201 | 5.0 |
| Ex. 37 | 27 | 50 | 117 | 238 | 0 | 51 | 120 | 270 | 2/1 | 67 | 101 | 5.0 |
| Ex. 38 | 27 | 100 | 117 | 238 | 0 | 101 | 120 | 270 | 2/1 | 67 | 201 | 5.0 |
| Ex. 39 | 27 | 100 | 117 | 238 | 0 | 101 | 120 | 270 | 2/1 | 67 | 201 | 5.0 |
| Ex. 40 | 35 | 100 | 116 | 243 | 0 | 101 | 120 | 270 | 2/1 | 67 | 201 | 5.0 |
| Ex. 41 | 18 | 100 | 117 | 255 | 0 | 101 | 120 | 270 | 2/1 | 67 | 201 | 5.0 |
| Ex. 42 | 27 | 100 | 117 | 238 | 2 | 101 | 120 | 265 | 2/1 | 67 | 201 | 5.0 |
| C. Ex. 12 | 27 | 100 | 117 | 238 | 27 | 101 | 117 | 238 | 2/1 | 67 | 201 | 5.0 |
| C. Ex. 13 | 27 | — | 117 | 238 | Single layer | | | | — | — | — | 5.0 |
| C. Ex. 14 | 0 | 100 | 120 | 270 | 0 | 101 | 120 | 270 | 2/1 | 67 | 201 | 5.0 |
| C. Ex. 15 | 27 | 1 | 117 | 238 | 0 | 1 | 120 | 270 | 2/1 | 67 | 2 | 5.0 |

| | Characteristic properties of film | | | | | | |
|---|---|---|---|---|---|---|---|
| | Young's modulus (Y)GPa | | Humidity expansion coefficient (αh) ppm/% RH | | Tanδ peak temperature | Coating | |
| | MD | TD | MD | TD | °C. | nonuniformity | Curling |
| Ex. 34 | 6.0 | 8.0 | 7.5 | 5.2 | 140 | ○ | ○ |
| Ex. 35 | 6.0 | 8.1 | 8.7 | 5.9 | 140 | ○ | ○ |
| Ex. 36 | 5.9 | 8.1 | 6.5 | 4.9 | 140 | Δ | ○ |
| Ex. 37 | 6.0 | 7.9 | 7.5 | 5.3 | 140 | ○ | ○ |
| Ex. 38 | 7.6 | 6.1 | 5.6 | 7.3 | 145 | ○ | ○ |
| Ex. 39 | 5.3 | 8.6 | 8.5 | 4.6 | 138 | ○ | ○ |
| Ex. 40 | 6.0 | 8.0 | 6.3 | 4.7 | 140 | ○ | ○ |
| Ex. 41 | 6.0 | 8.0 | 8.0 | 6.0 | 140 | ○ | ○ |
| Ex. 42 | 6.0 | 8.0 | 7.3 | 5.0 | 139 | ○ | ○ |
| C. Ex. 12 | 5.8 | 8.5 | 5.6 | 4.4 | 125 | X | ○ |
| C. Ex. 13 | 5.8 | 8.5 | 5.6 | 4.4 | 125 | X | ○ |
| C. Ex. 14 | 5.5 | 9.5 | 13.5 | 8.6 | 155 | ○ | ○ |
| C. Ex. 15 | 5.5 | 7.1 | 8.2 | 6.1 | 147 | ○ | X |

Ex.: Example
C. Ex.: Comparative Example

In Table 4, the content of ANA is the amount of the 6,6'-(alkylenedioxy)di-2-naphthoic acid based on the total number of moles of all the acid components, Tg is the glass transition temperature, and Tm is the melting point.

Effect Of The Invention

The laminated film of the present invention has excellent dimensional stability which cannot be achieved by polyethylene terephthalate, polyethylene-2,6-naphthalene carboxylate and polyalkylene-6,6'-(alkylenedioxy)di-2-naphthoates.

Particularly, the laminated film of the present invention rarely elongates when a load is applied thereto at a high temperature, thereby making it possible to prevent creasing after high-temperature processing. The multi-layer laminated film of the present invention hardly curls even when it is heated.

The laminated film of the present invention has excellent flatness and windability. Even when the laminated film of the present invention contains relatively large particles as compared with the thickness of the film layer, it has few voids and excellent chipping resistance.

Industrial Feasibility

Since the laminated film of the present invention has excellent dimensional stability to temperature and humidity, it can be advantageously used as a base film for high-density magnetic recording media.

The invention claimed is:

1. A biaxially oriented laminated film comprising a film layer B on one side of a film layer A and having a surface roughness (RaB) on the film layer B side which is 1 nm or more larger than the surface roughness (RaA) on the film layer A side, wherein
at least one of the film layers comprises an aromatic polyester (I) composed of a glycol component and a dicarboxylic acid component containing 5 mol % or more and 45 mol % or less of a unit represented by the following formula (A):

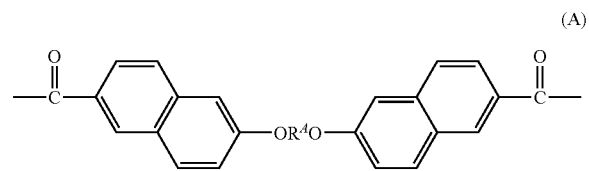

(A)

wherein $R^A$ is an alkylene group having 1 to 10 carbon atoms.

2. The film according to claim 1, wherein the aromatic polyester (I) contains 5 mol % or more and 45 mol % or more of the unit represented by the formula (A) and 55 mol % or more and 95 mol % or less of a unit represented by the following formula (B) as a dicarboxylic acid component:

(B)

wherein $R^B$ is a phenylene group or naphthalenediyl group.

3. The film according to claim 1, wherein the aromatic polyester (I) contains 90 to 100 mol % of a unit represented by the following formula (C) as a diol component:

—O—$R^C$—O— (C)

wherein $R^C$ is an alkylene group having 2 to 10 carbon atoms.

4. The film according to claim 1, wherein the aromatic polyester (I) has an intrinsic viscosity measured at 35° C. in a mixed solvent of p-chlorophenol and 1,1,2,2-tetrachloroethane (weight ratio of 40/60) of 0.4 to 1.5 dl/g.

5. The film according to claim 1, wherein the film layer B comprises the aromatic polyester (I).

6. The film according to claim 1, wherein both the film layer A and the film layer B comprise the aromatic polyester (I).

7. The film according to claim 1, wherein the surface roughness (RaA) on the film layer A side is 1 to 7 nm and the surface roughness (RaB) on the film layer B side is 5 to 15 nm.

8. The film according to claim 1, wherein the thickness of the film layer B accounts for 50 to 90% of the total thickness of the laminated film.

9. The film according to claim 1, wherein the film layer B comprises the aromatic polyester (I) and particles having an average particle diameter (dB) of 50 nm or more and contains particles B whose average particle diameter (dB) satisfies the following expression (1) with respect to the thickness (tB) of the film layer B as particles having the largest average particle diameter:

0.2≦tB/dB≦10 (1).

10. The film according to claim 7, wherein the surface roughness (RaB) on the film layer B side is 5 to 10 nm.

11. The film according to claim 7, wherein the particles B are at least one type of particles selected from the group consisting of silica particles and organic polymer particles.

12. The film according to claim 11, wherein the organic polymer particles are at least one type of particles selected from the group consisting of silicone resin particles and crosslinked polystyrene particles.

13. The film according to claim 9, wherein the surface roughness (RaB) on the film layer B side is 1 nm or more larger than the surface roughness (RaA) on the film layer A side.

14. The film according to claim 1 which is used as a base film for magnetic recording media.

15. The film according to claim 1, wherein the aromatic polyester (I) contains
5 mol % or more and 45 mol % or more of the unit represented by the formula (A),
55 mol % or more and 95 mol % or less of a unit represented by the following formula (B) as a dicarboxylic acid component, and
90 to 100 mol % of a unit represented by the following formula (C) as a diol component:

(B)

wherein $R^B$ is a phenylene group or naphthalenediyl group;

—O—$R^C$—O— (C)

wherein $R^C$ is an alkylene group having 2 to 10 carbon atoms.

* * * * *